Figure 3:
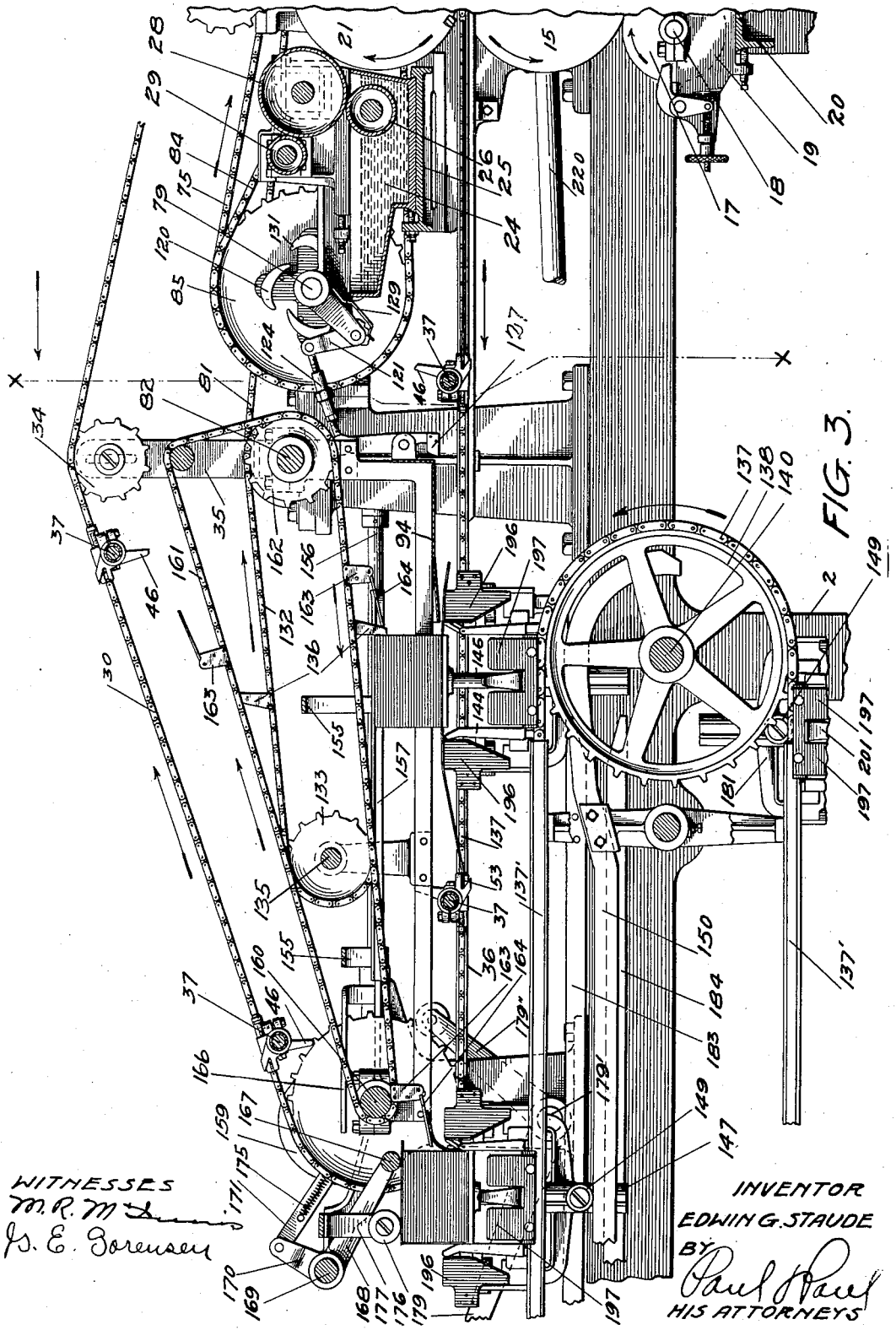

E. G. STAUDE.
WRAPPING MACHINE.
APPLICATION FILED JULY 3, 1911.
1,130,938.
Patented Mar. 9, 1915.
19 SHEETS—SHEET 1.
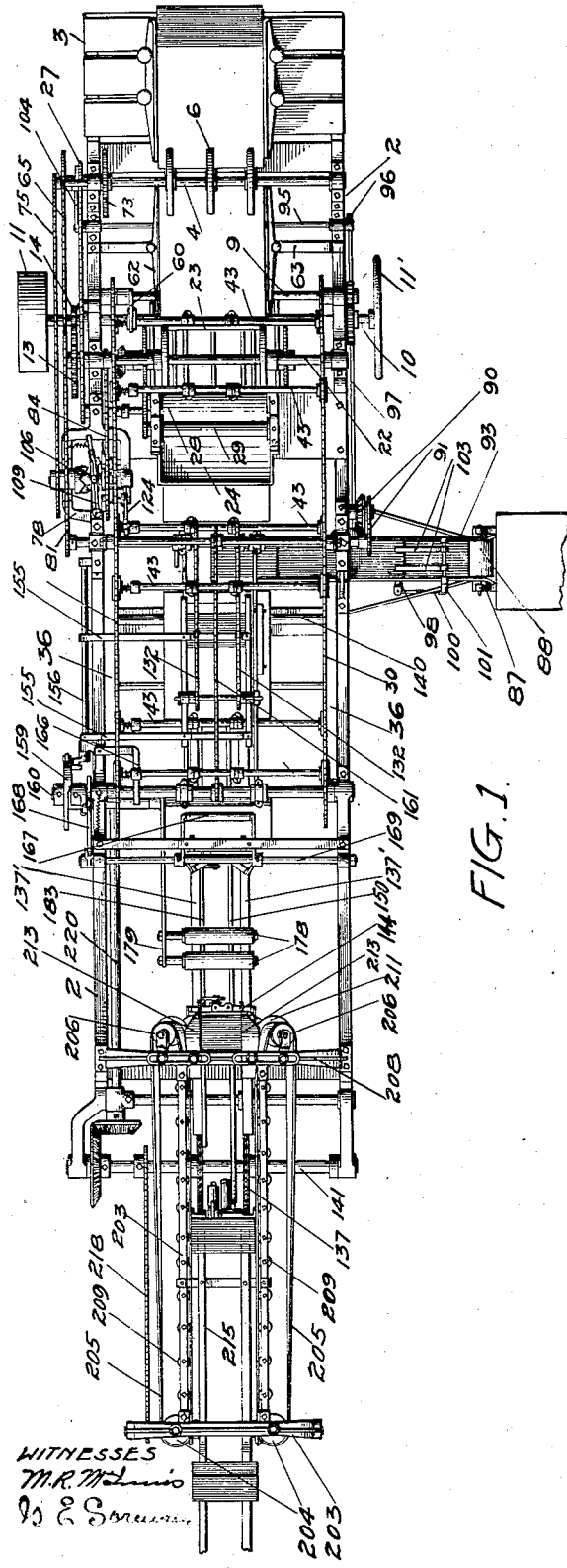
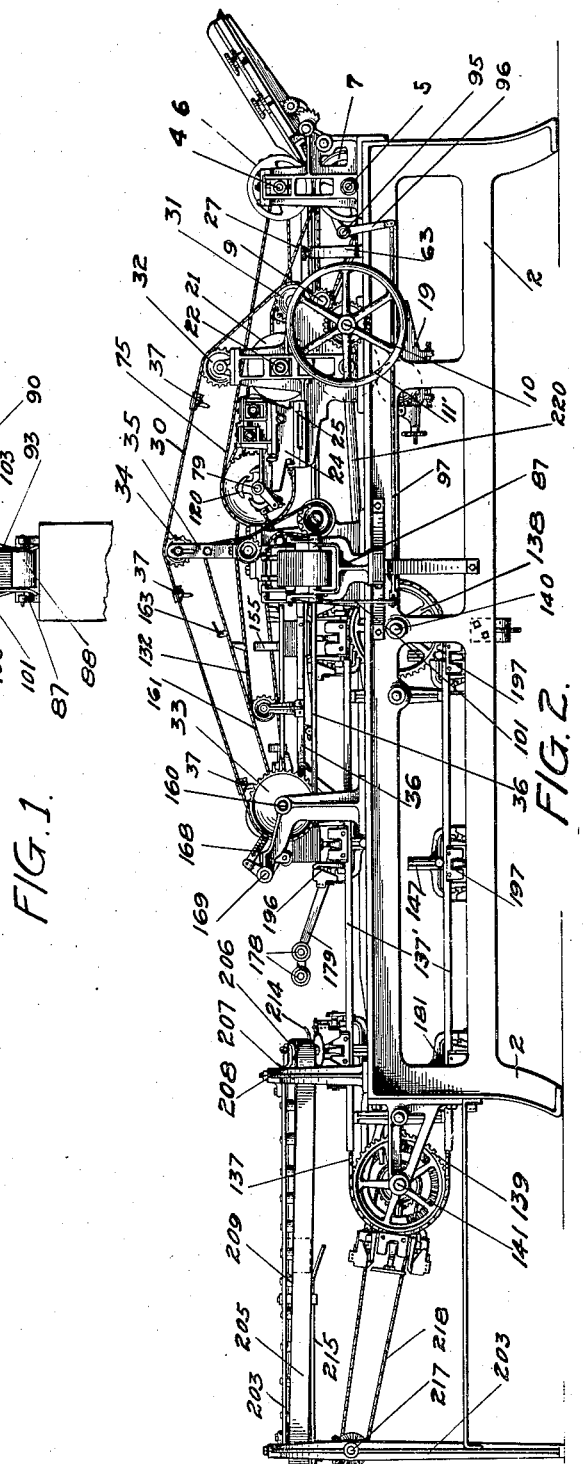
WITNESSES
INVENTOR
EDWIN G. STAUDE
BY
HIS ATTORNEYS

E. G. STAUDE.
WRAPPING MACHINE.
APPLICATION FILED JULY 3, 1911.

1,130,938.

Patented Mar. 9, 1915.
19 SHEETS—SHEET 2.

INVENTOR
EDWIN G. STAUDE
HIS ATTORNEYS

E. G. STAUDE.
WRAPPING MACHINE.
APPLICATION FILED JULY 3, 1911.

1,130,938.

Patented Mar. 9, 1915.
19 SHEETS—SHEET 3.

SEC. X-X

WITNESSES

INVENTOR
EDWIN G. STAUDE
BY
HIS ATTORNEYS

E. G. STAUDE.
WRAPPING MACHINE.
APPLICATION FILED JULY 3, 1911.

1,130,938.

Patented Mar. 9, 1915.
19 SHEETS—SHEET 4.

WITNESSES
M. R. M^cInnis
G. E. Sorensen

INVENTOR
EDWIN G. STAUDE
BY
Paul Paul
HIS ATTORNEYS

E. G. STAUDE.
WRAPPING MACHINE.
APPLICATION FILED JULY 3, 1911.

1,130,938.

Patented Mar. 9, 1915.
19 SHEETS—SHEET 5.

WITNESSES
M. R. McInnis
D. E. Sorensen

INVENTOR
EDWIN G. STAUDE
BY
Paul & Paul
HIS ATTORNEYS

E. G. STAUDE.
WRAPPING MACHINE.
APPLICATION FILED JULY 3, 1911.

1,130,938.

Patented Mar. 9, 1915.
10 SHEETS—SHEET 6.

WITNESSES
M. R. McInnis
D. E. Sorensen

INVENTOR
EDWIN G. STAUDE
BY
Paul & Paul
HIS ATTORNEYS

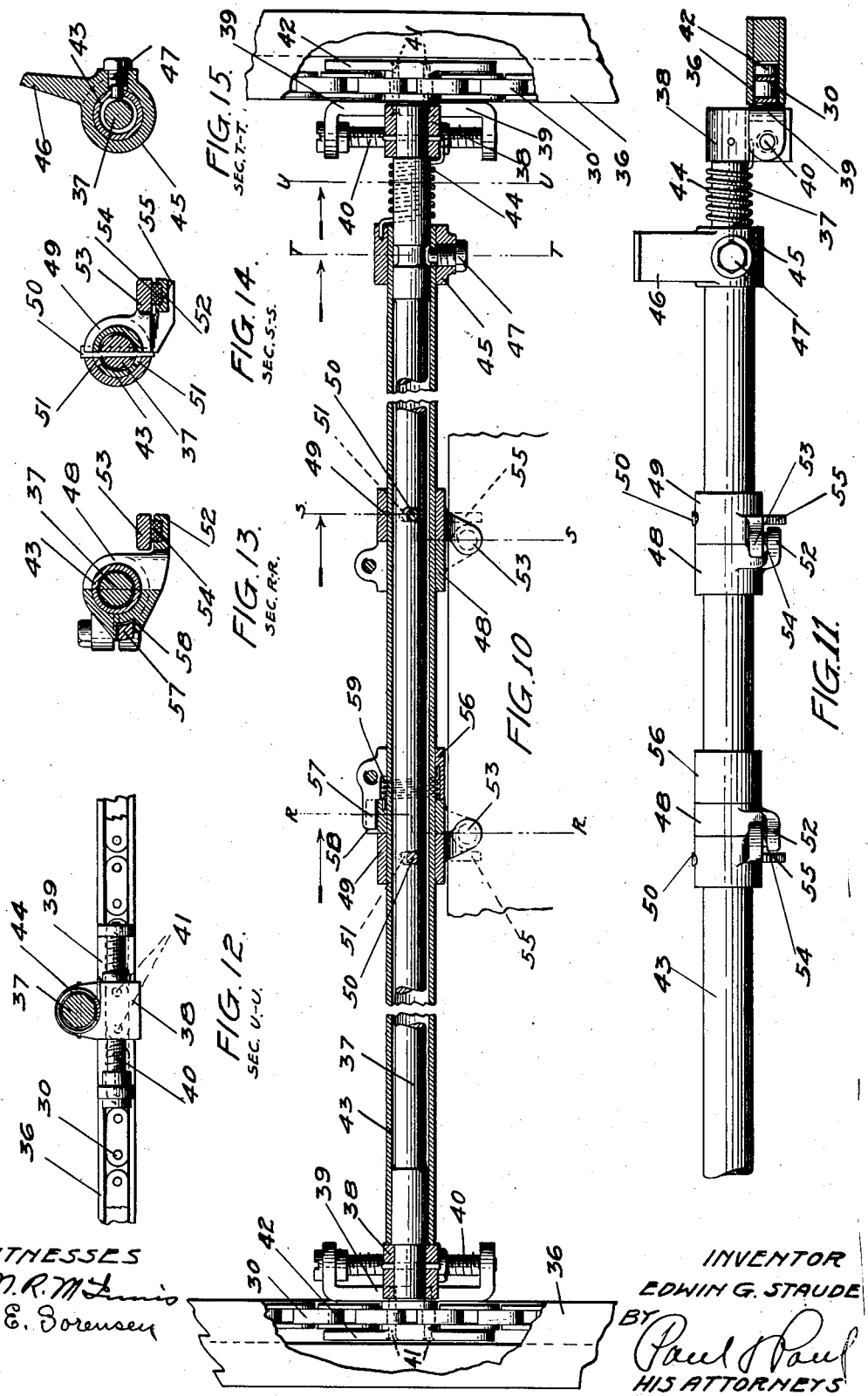

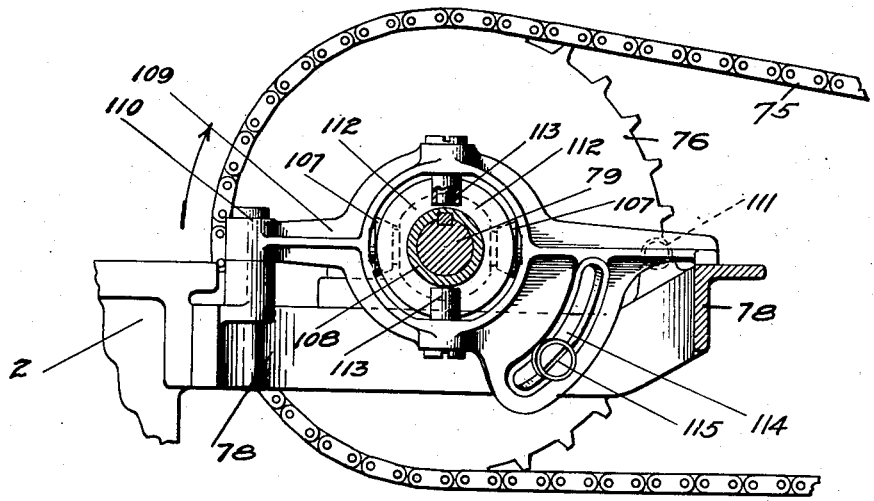
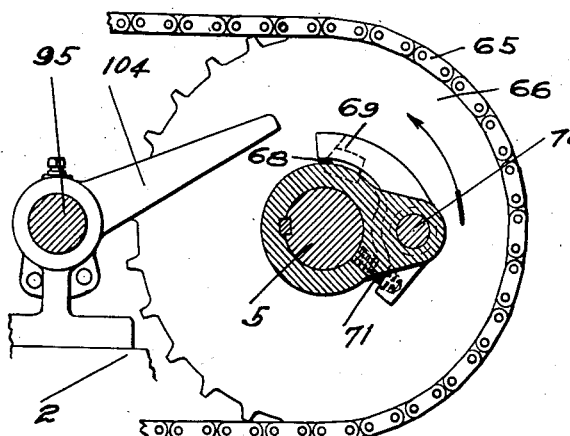
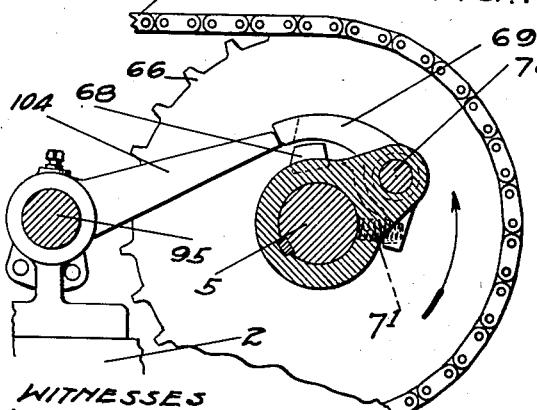
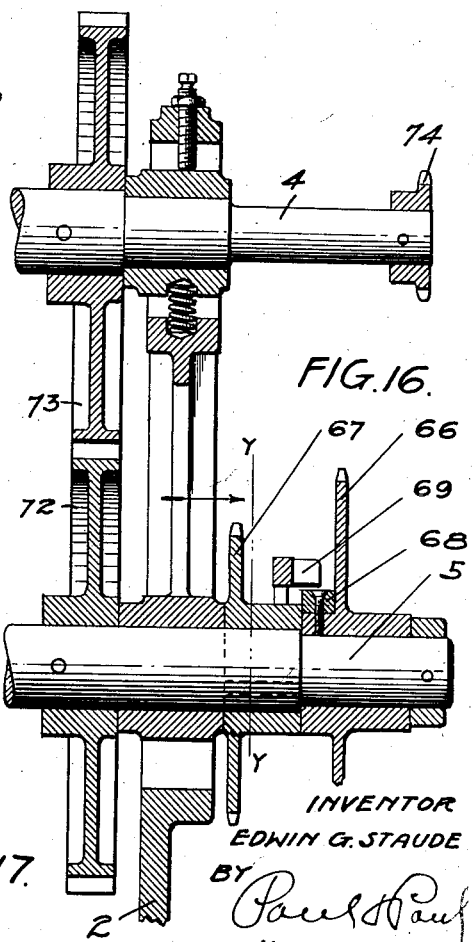

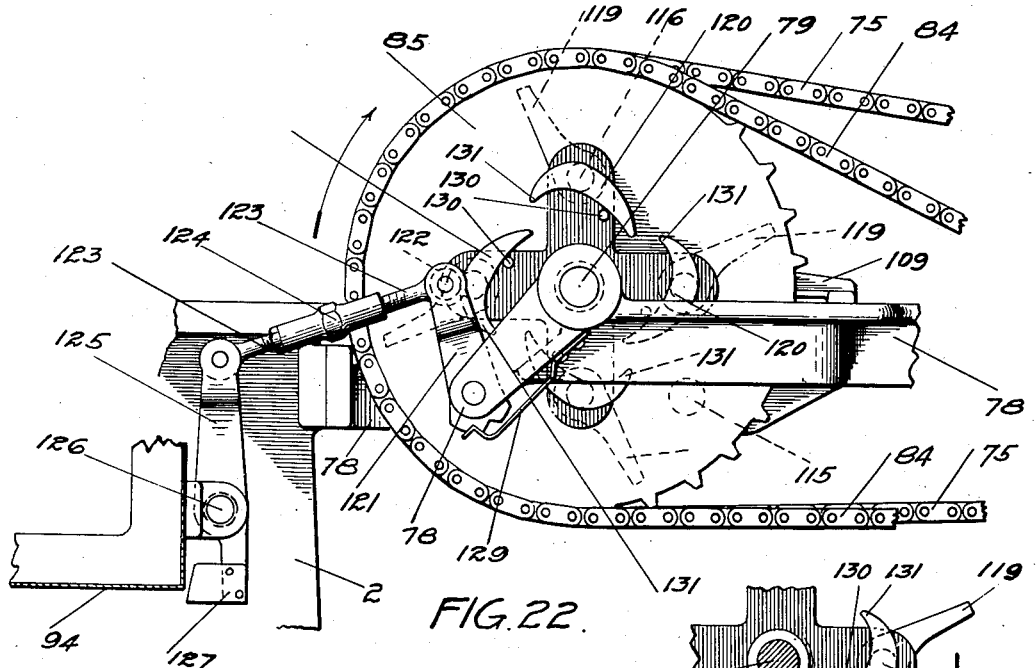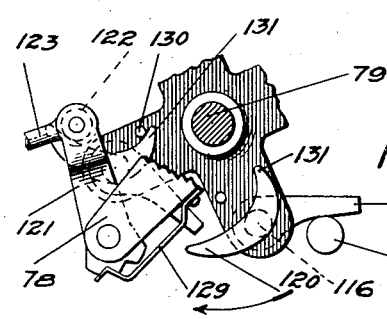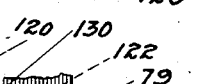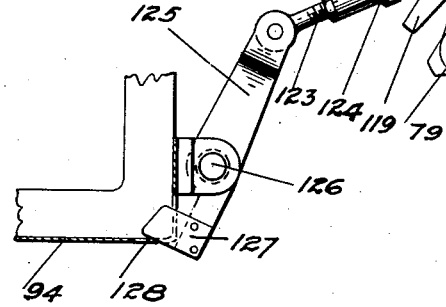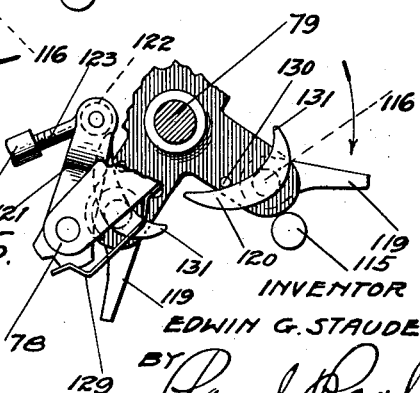

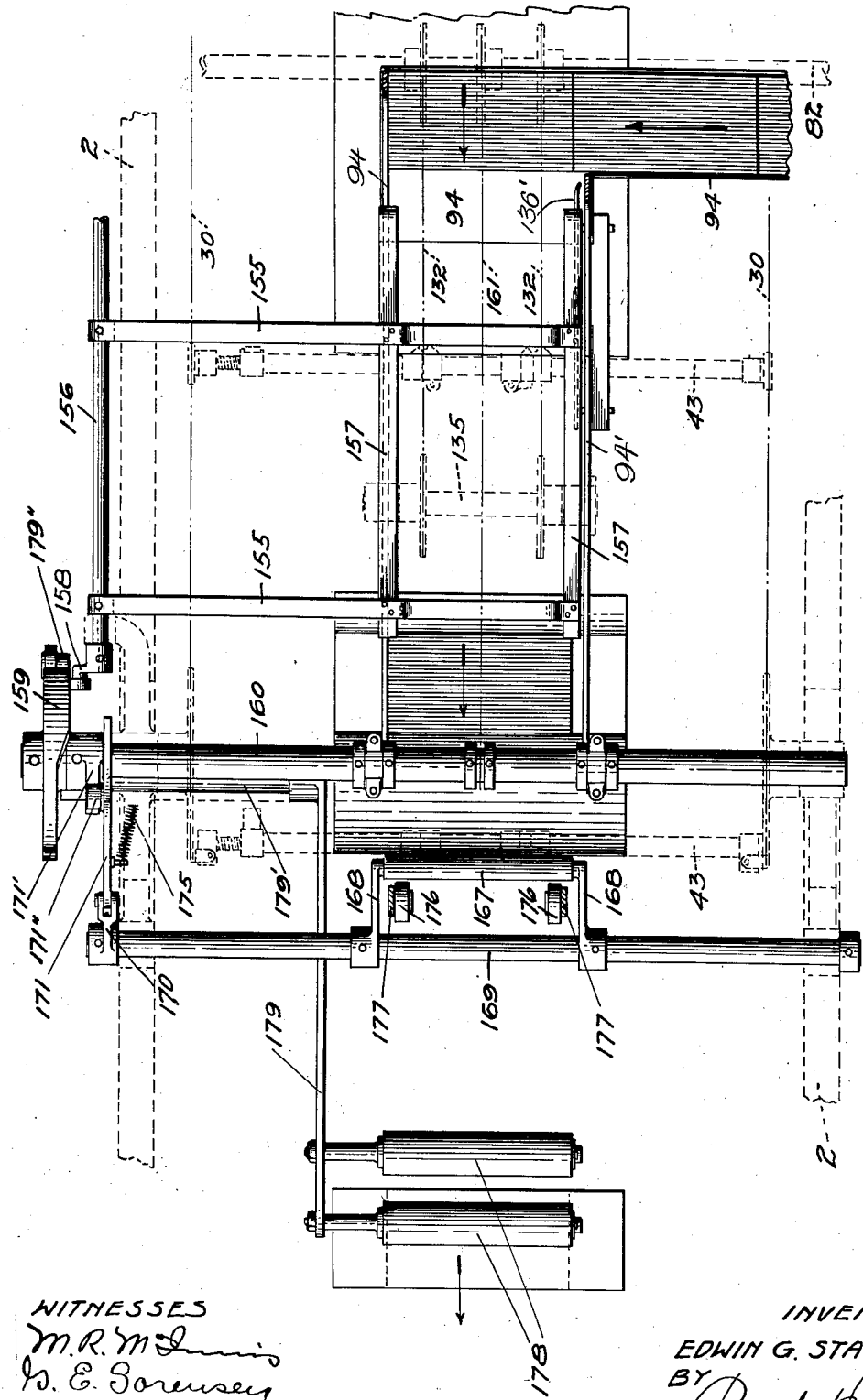

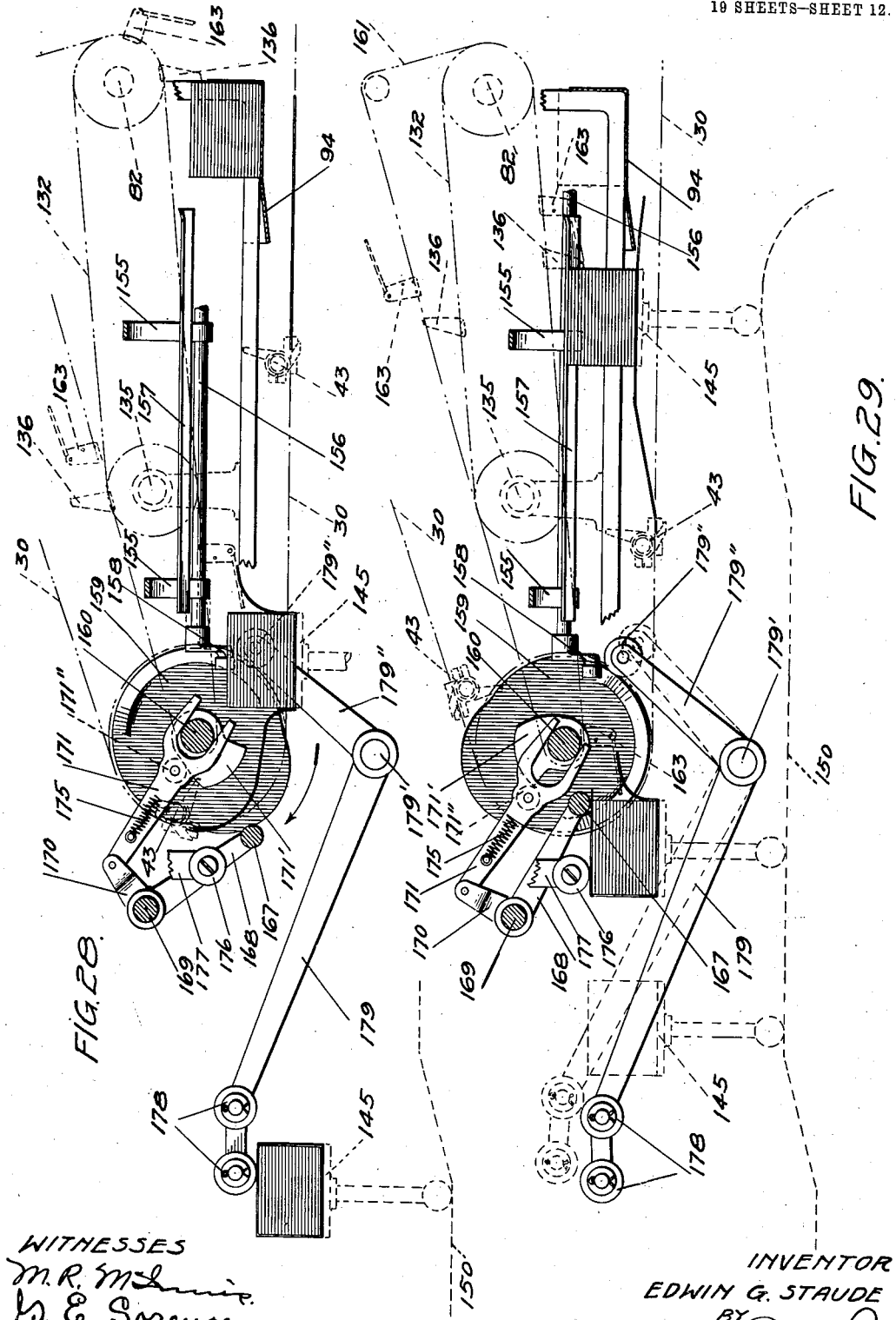

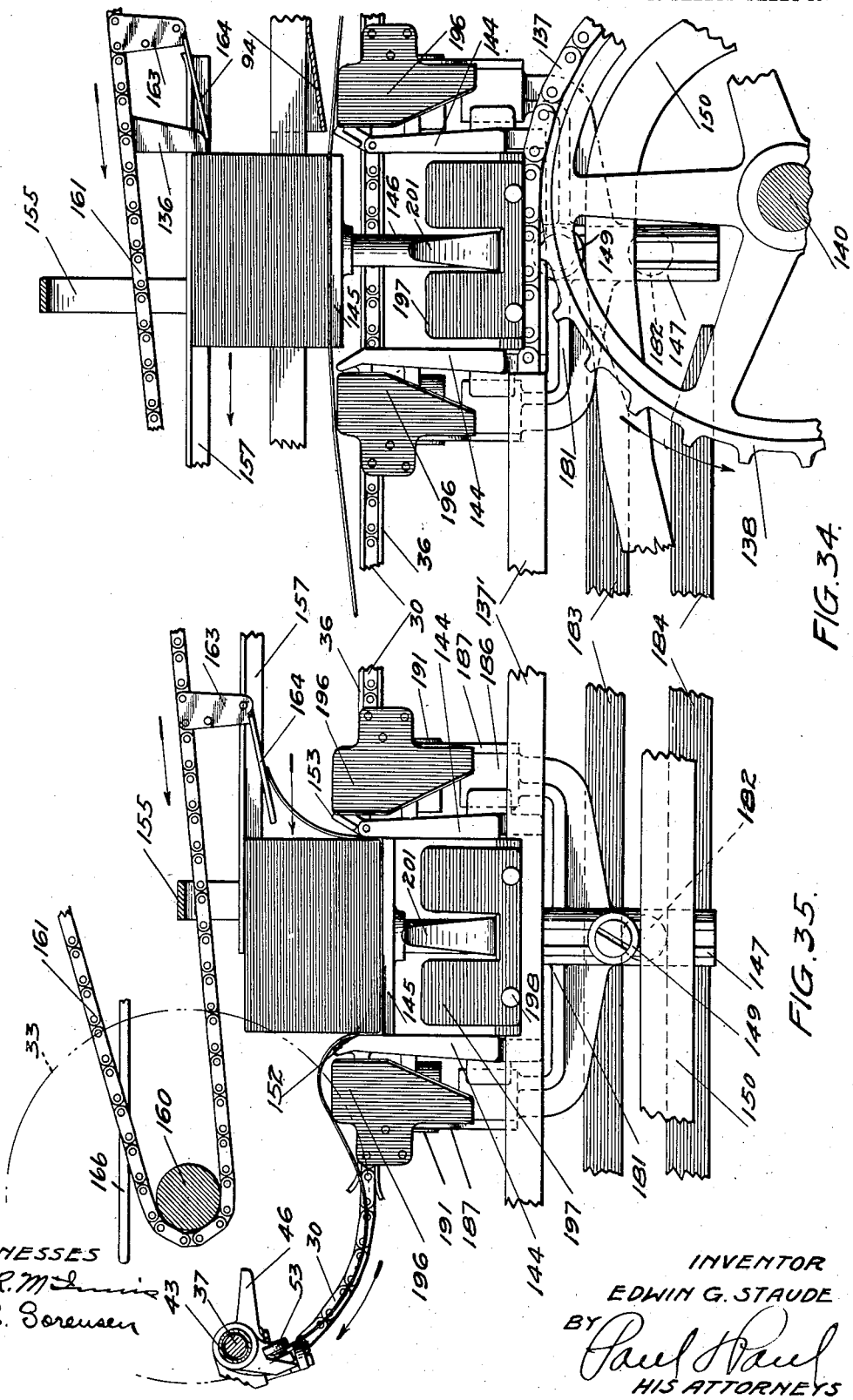

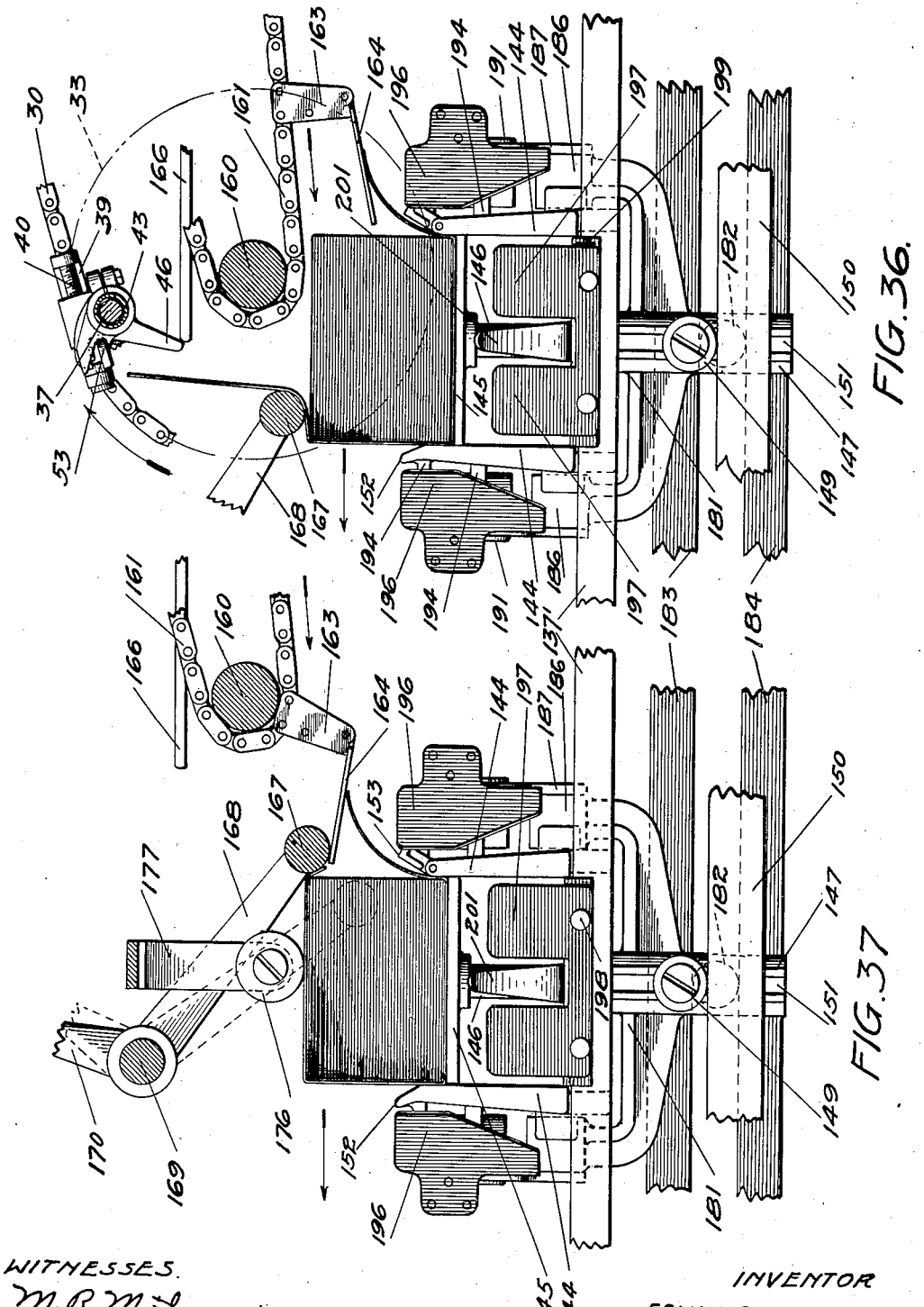

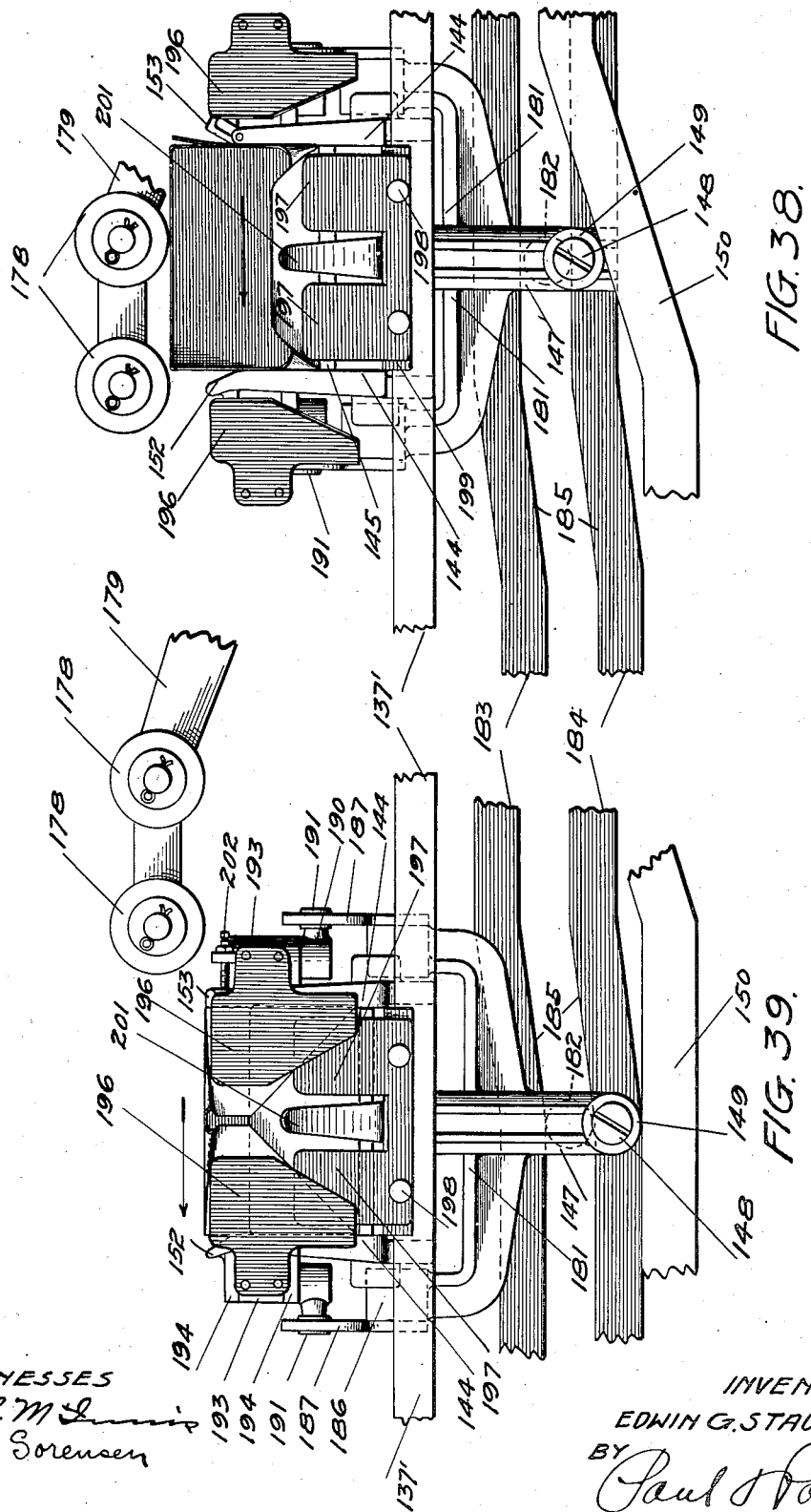

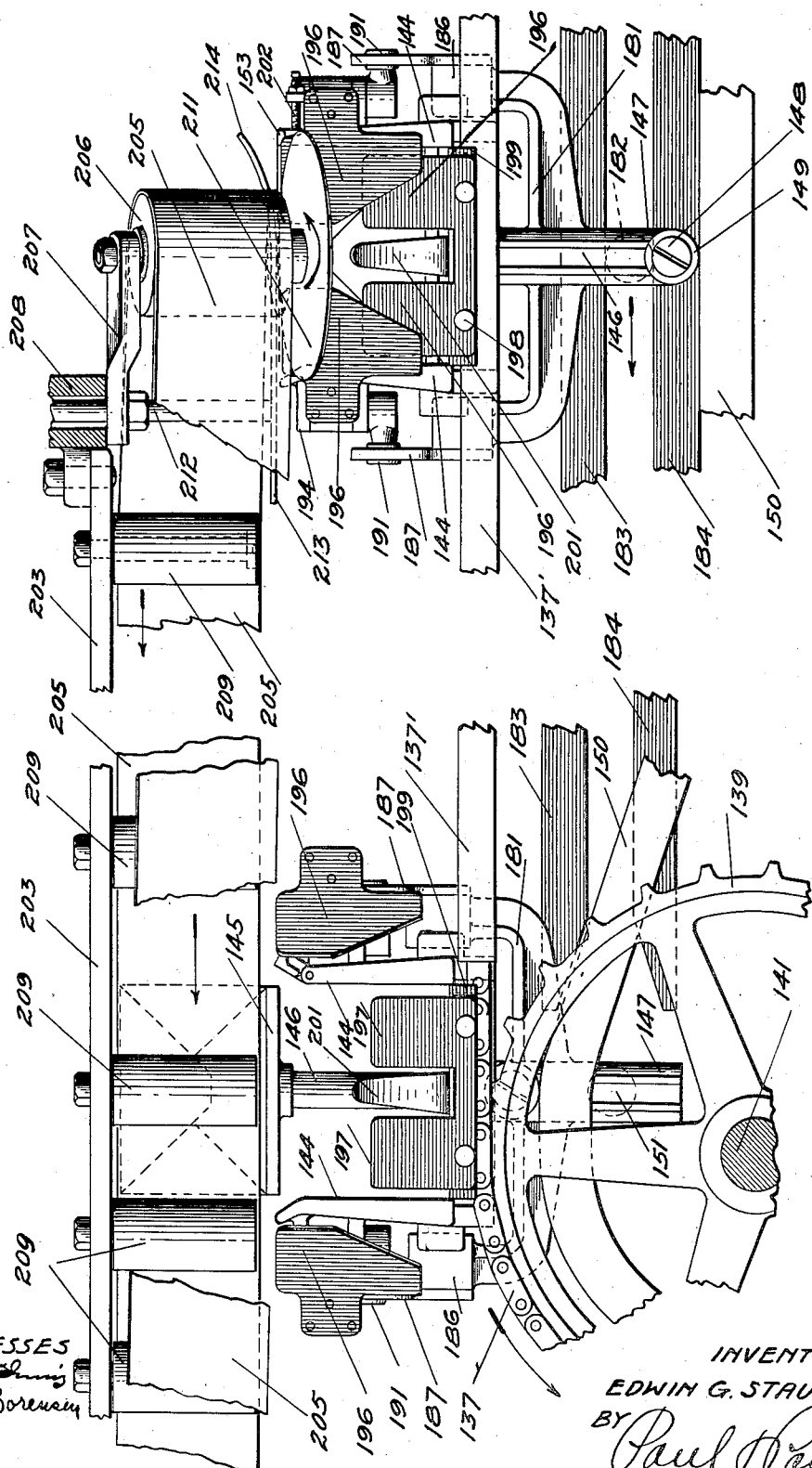

SEC. C-C.

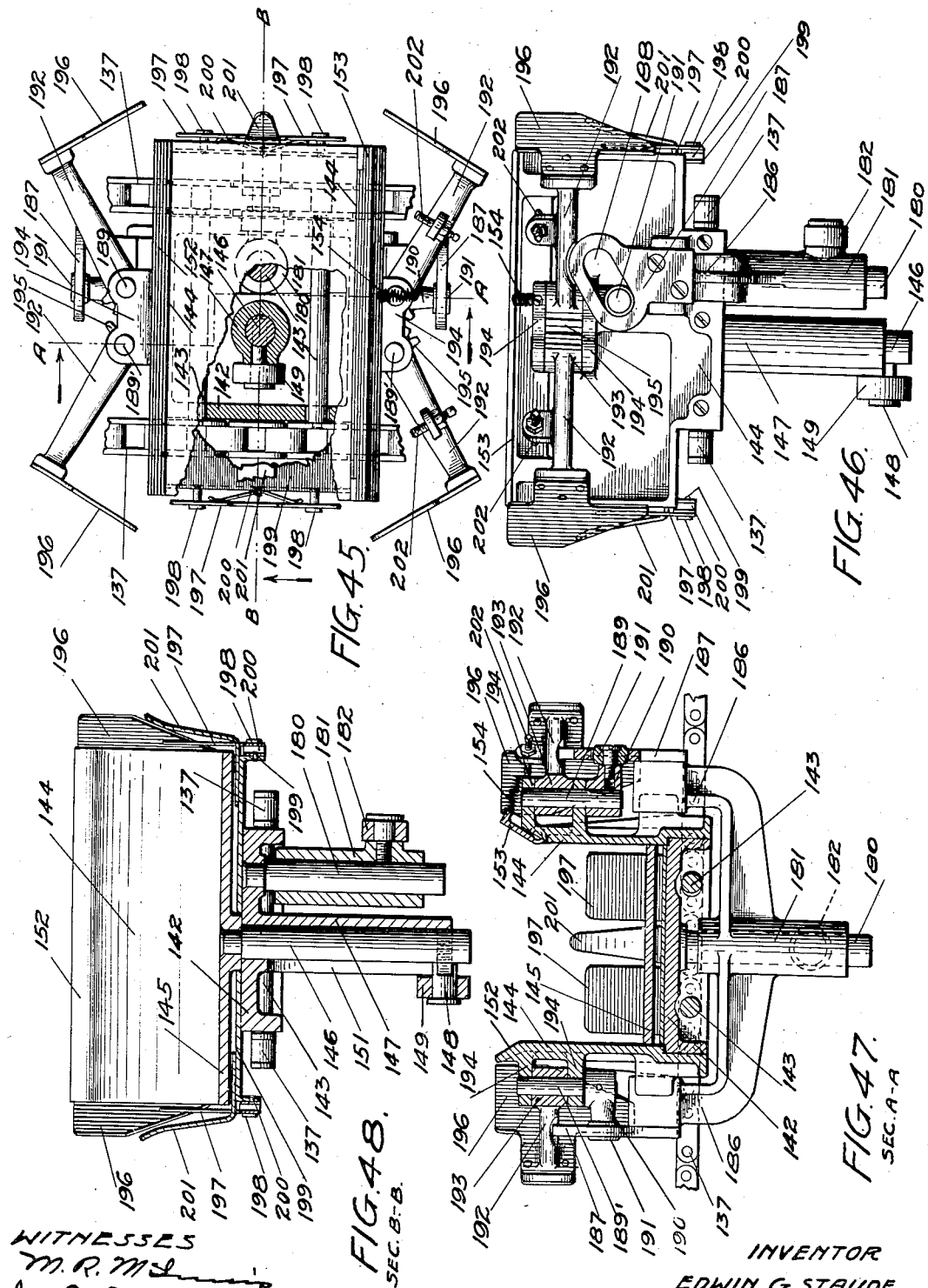

UNITED STATES PATENT OFFICE.

EDWIN GUSTAVE STAUDE, OF MINNEAPOLIS, MINNESOTA.

WRAPPING-MACHINE.

1,130,938.   Specification of Letters Patent.   Patented Mar. 9, 1915.

Application filed July 3, 1911. Serial No. 636,805.

*To all whom it may concern:*

Be it known that I, EDWIN G. STAUDE, of Minneapolis, Hennepin county, Minnesota, have invented certain new and useful Improvements in Wrapping - Machines, of which the following is a specification.

Wrapping machines as usually constructed utilize a plunger to stop the package for the different operations of wrapping, no provision being made for centering the panels of the label or obtaining an accurate register. The friction of the package against the label is depended upon entirely to insure the position of the label and owing to slippage the relative position of the label and the package invariably changes during the wrapping operation. This shifting of the label is not of so much importance in wrapping soap and similar articles, where no accurate register of the label panel is required, but in wrapping cereal foods put up in rectangular packages it is necessary that the printed or lithographed panels of the label shall be accurately centered on the panels of the package; otherwise the package will have an unfinished look and will not present a neat, ornamental appearance for display purposes on the store shelves. Furthermore, use of the ordinary wrapping machine on labels requiring accurate work and perfect register has resulted in such a great waste in labels and damage to the packages and the machines operate at such a comparatively slow speed that there is very little saving as compared with hand labor.

The object, therefore, of my present invention is to provide a wrapping machine which can be operated at a comparatively high speed and which will wrap packages of cereal or other articles so that the panels of the labels will be accurately centered on the panels of the package and a perfect register maintained at all times between the package and the label.

A further object is to provide a machine in which the successive operations of gumming the label, registering the label with the package and folding the label around the package will be carried on continuously without checking the movement of the package or the label through the machine.

A further object is to provide a means for feeding the labels or wrappers positively and accurately, releasing them only when the package has been accurately centered on the label and the label partially folded around the package, so that the perfect centering of the panels of the label with the panels of the package will be positively insured.

Other objects of the invention will appear from the following detailed description.

My invention consists generally in means for feeding the labels and means for feeding the article to be wrapped into the path of the labels and mechanism whereby the movement of the label and the article will be accurately timed so that the article and the label will register accurately at the initial stage of the wrapping operation.

Further the invention consists in mechanism controlled by the label feeding means for regulating the feed of the package or article to be wrapped.

Further the invention consists in means controlled by the position of the package or article to be wrapped for regulating the operation of the feeding mechanism.

Further the invention consists in a wrapping device and means for positively holding the label during the initial steps of the wrapping or folding operation.

Further the invention consists in a wrapping or folding mechanism which will accurately and smoothly fold the wrapper or label around the package or article.

Further the invention consists in various constructions and combinations, all as hereinafter described and particularly pointed out in the claims.

Figure 4:
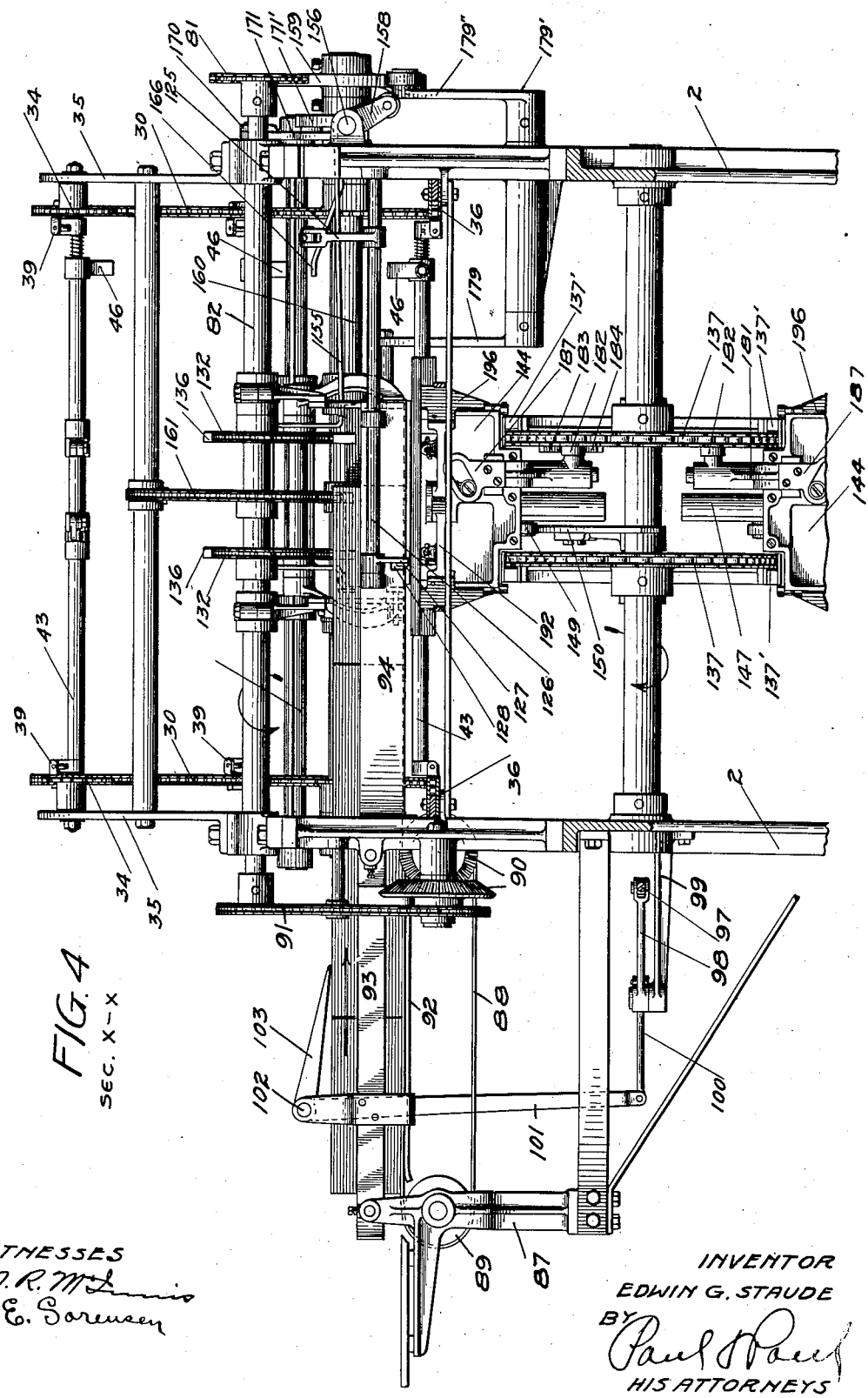
Figure 5:
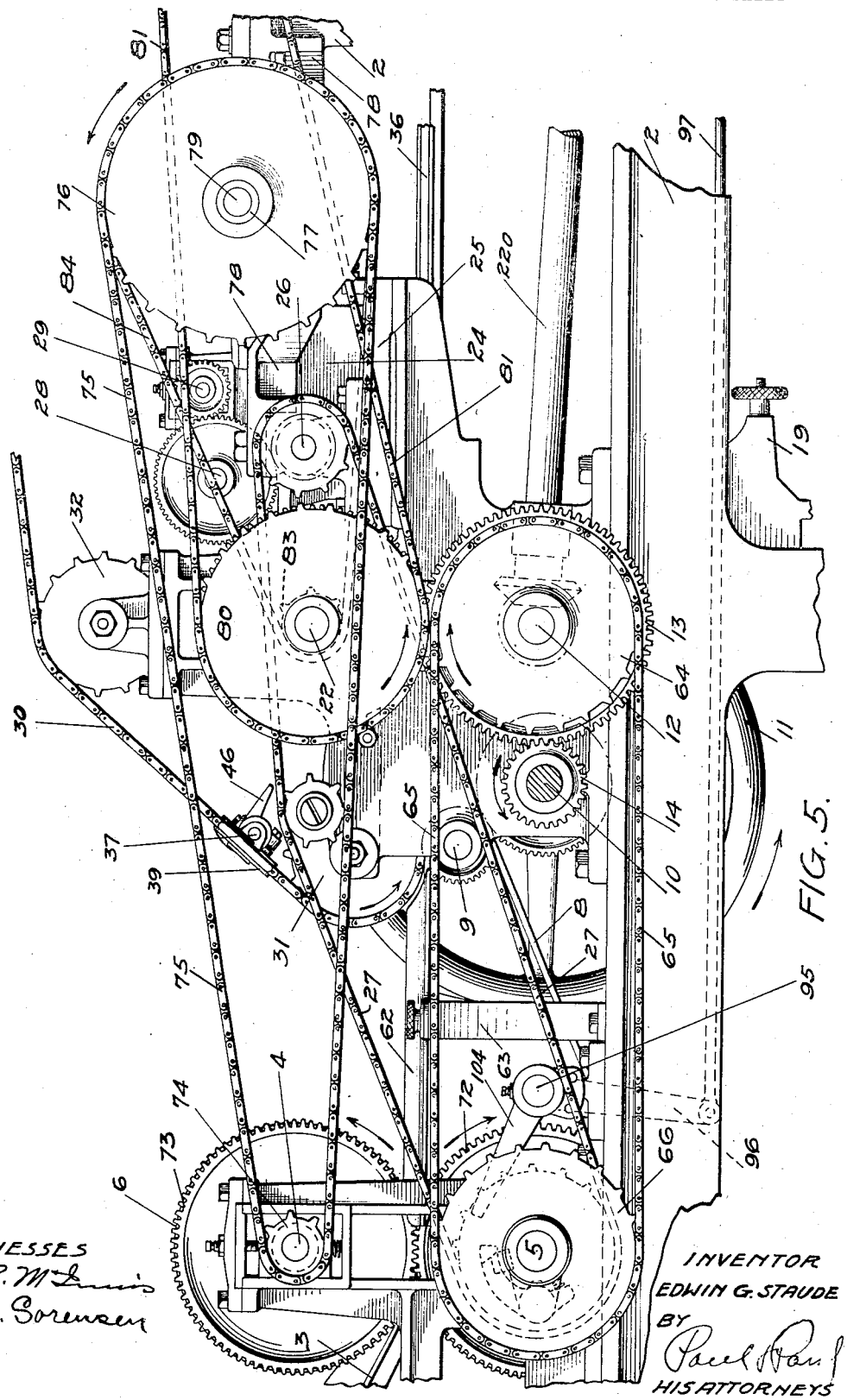
Figure 6:
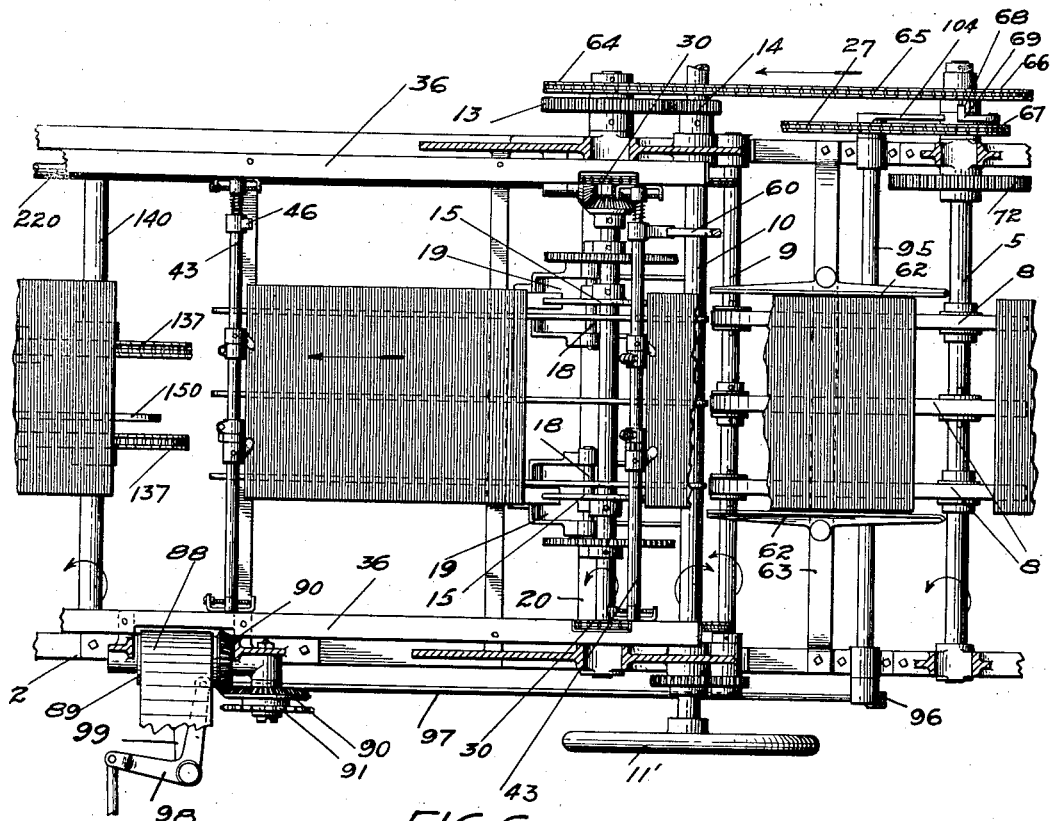
Figure 7:
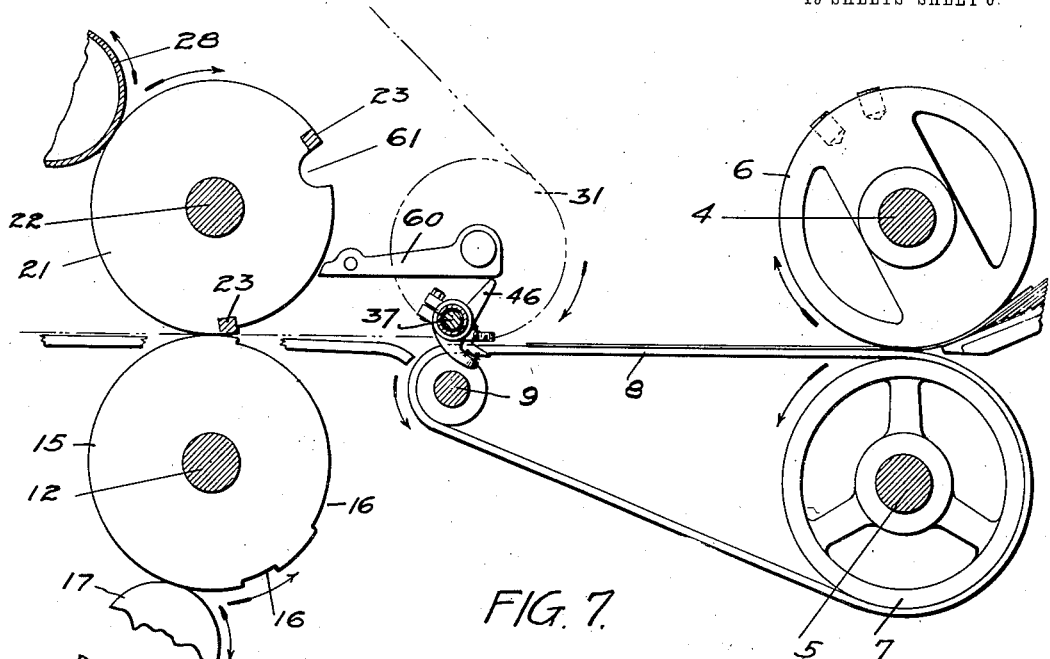
Figure 8:
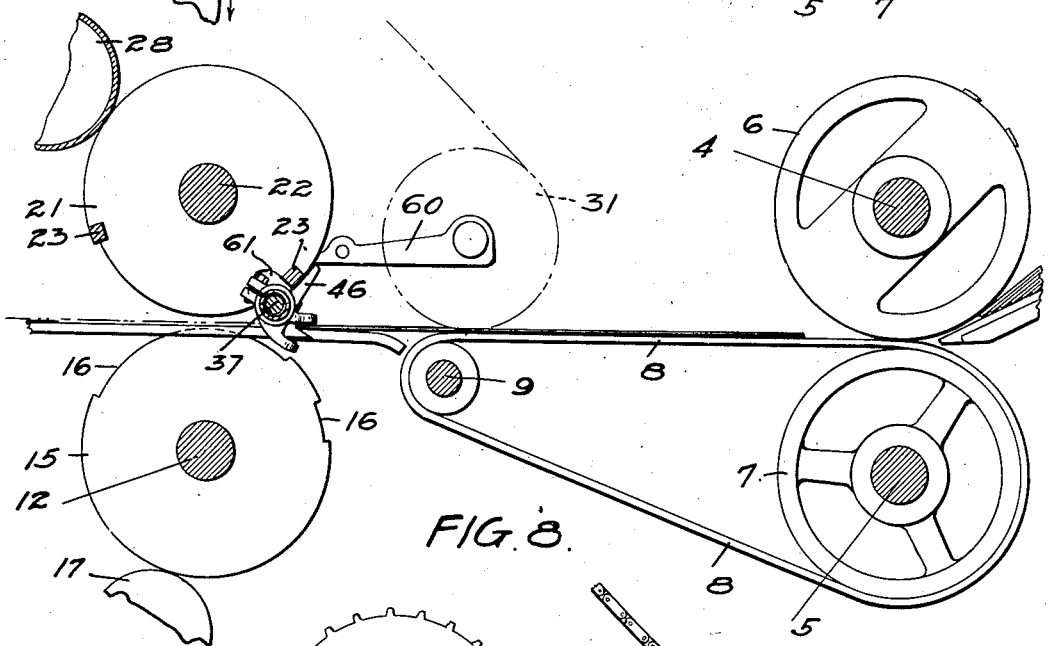
Figure 9:
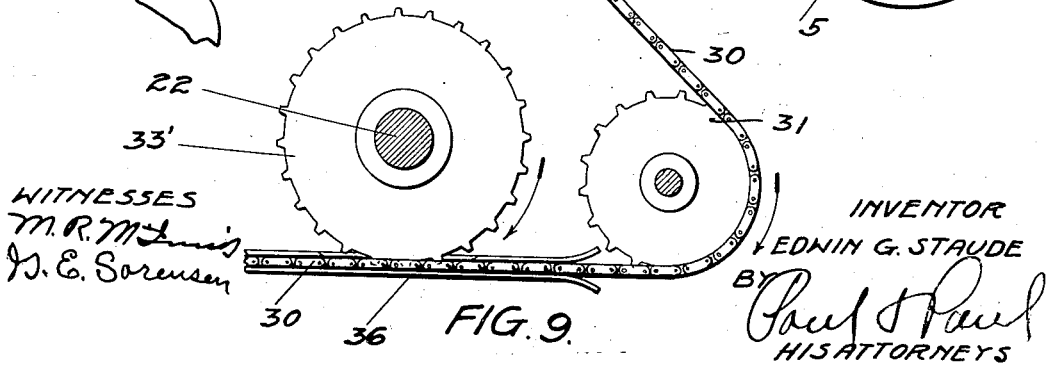

In the accompanying drawings forming part of this specification, Figure 1 is a plan view of a wrapping machine embodying my invention, Fig. 2 is a side elevation of the same, Fig. 3 is a longitudinal sectional view of the middle portion of the machine, Fig. 4 is a transverse sectional view on the line X—X of Fig. 3, Fig. 5 is a sectional view of the receiving end of the machine showing the driving mechanism, Fig. 6 is a plan section of the receiving end of the machine, Figs. 7, 8 and 9 are detail views showing the operation of the gripper bars and means for advancing the labels in the machine, Fig. 10 is a detail view showing the preferred manner of mounting the gripper bar mechanism, Fig. 11 is a view of the gripper bar jaws and the supports for the same, Fig. 12 is a sectional view on the line U—U of Fig.

Figure 30:
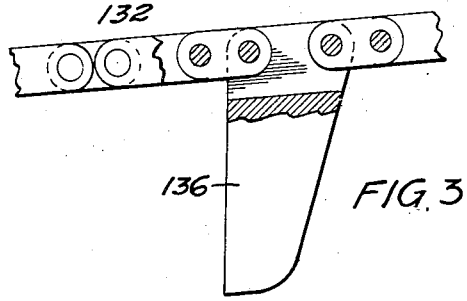
Figure 31:
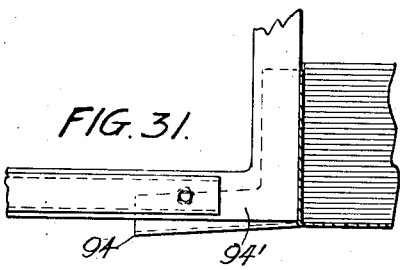
Figure 33:
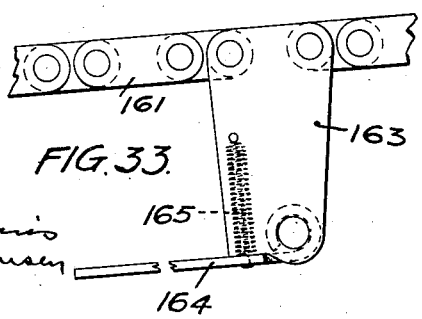
Figure 32:
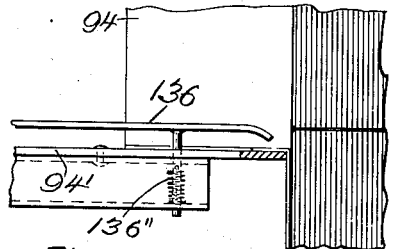
Figure 20:
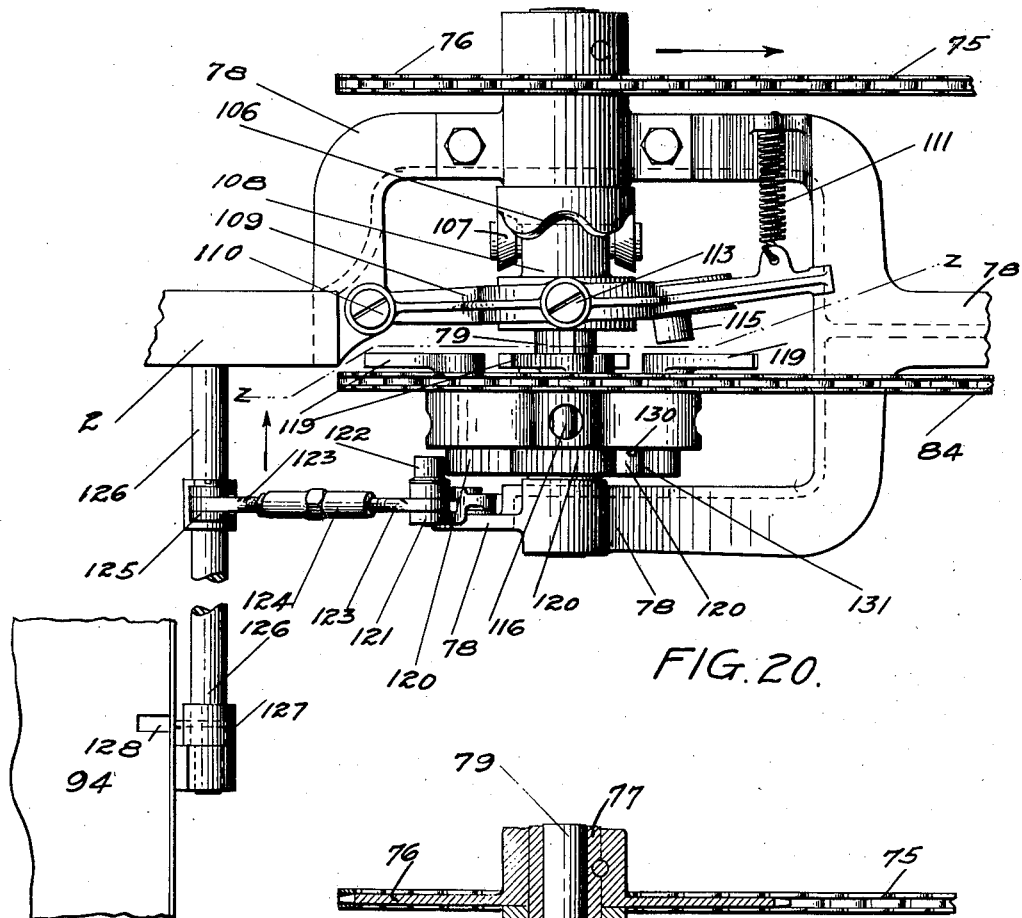
Figure 21:
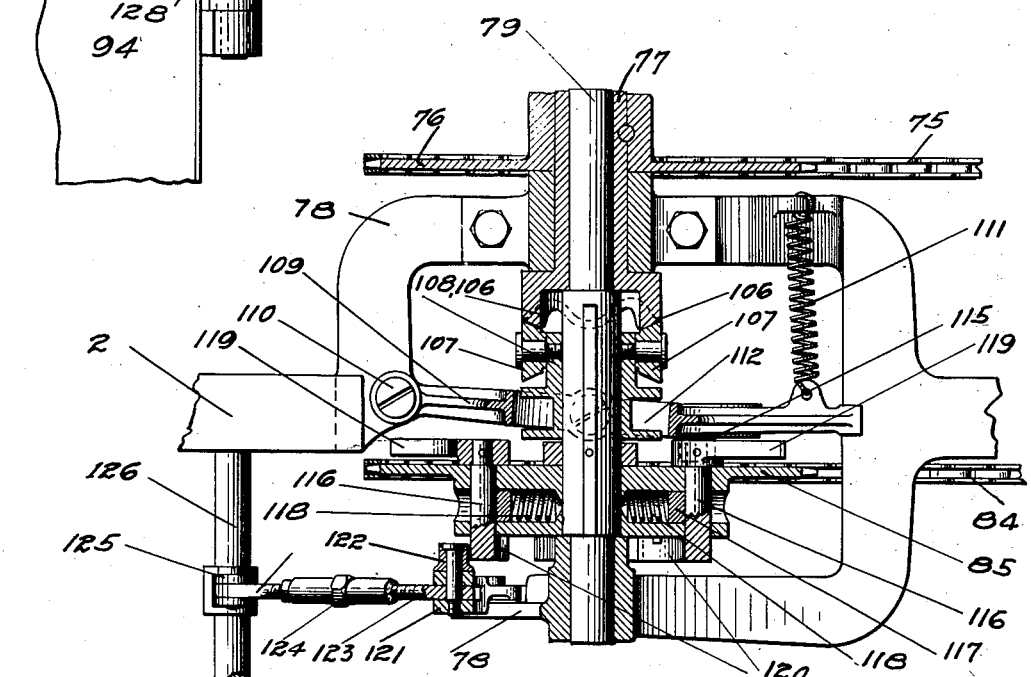
Figure 42:
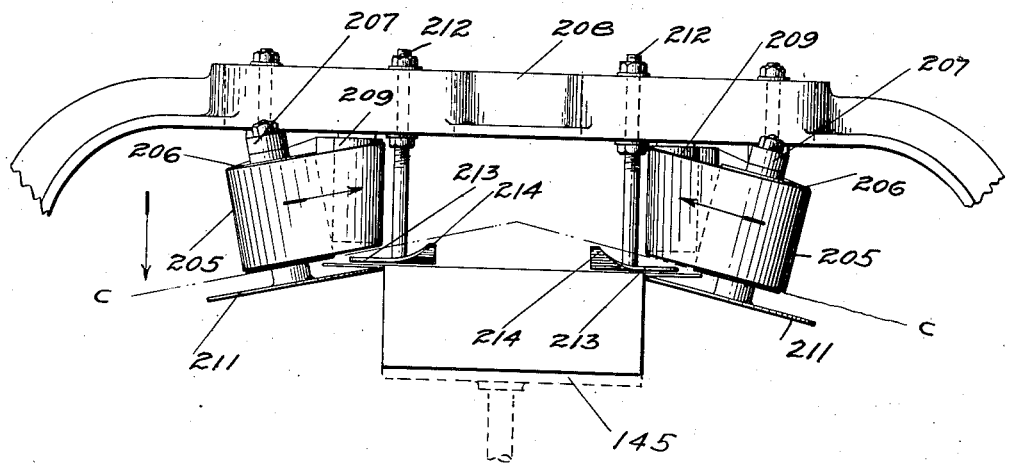
Figure 44:
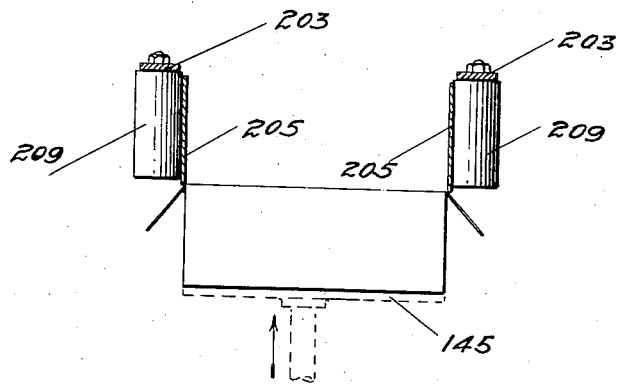
Figure 43:
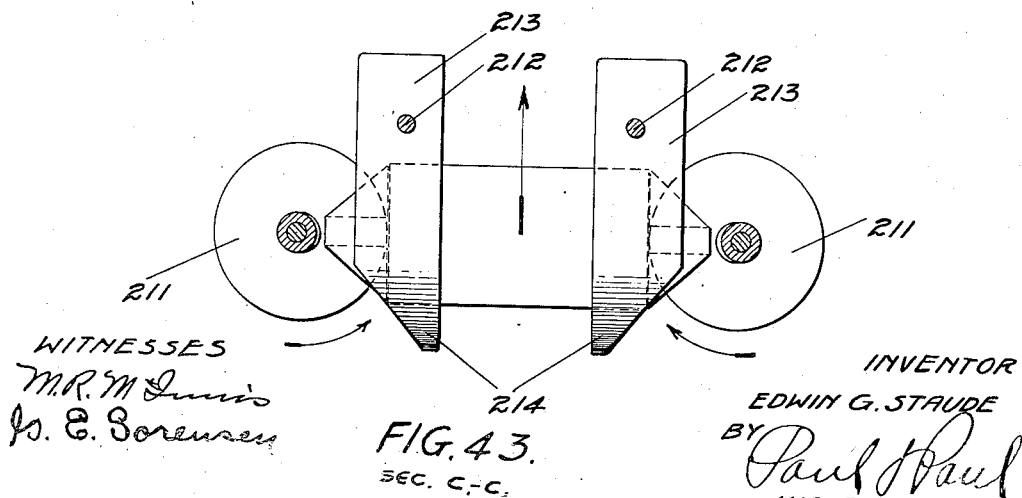
Figure 49:
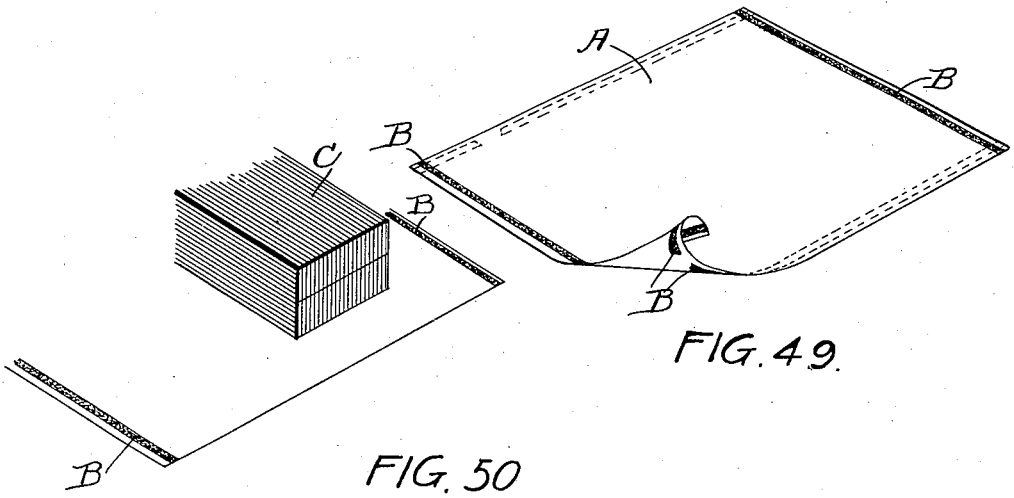
Figure 50:
Figure 51:
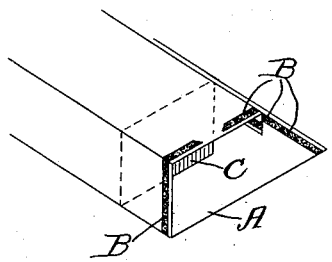
Figure 52:
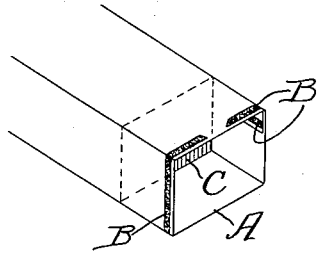
Figure 53:
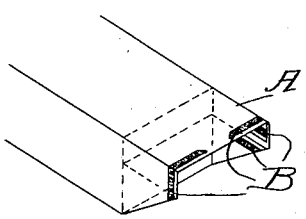
Figure 54:
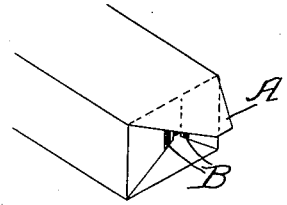
Figure 55:
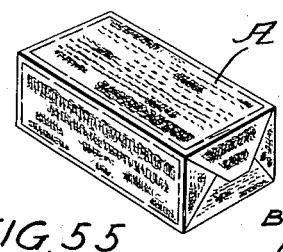

10, Fig. 13 is a sectional view on the line R—R of Fig. 10, Fig. 14 is a sectional view on the line S—S of Fig. 10, Fig. 15 is a sectional view on line T—T of Fig. 10, Fig. 16 is a sectional view of the clutch mechanism controlling the feed of the labels into the machine, Fig. 17 is a sectional view on the line Y—Y of Fig. 16, Fig. 18 is a similar view to 17 showing the parts in a different position, Fig. 19 is a sectional view on the line Z—Z of Fig. 20, Fig. 20 is a plan view of the mechanism for regulating the feed of the package into the path of the moving labels, Fig. 21 is a sectional view of Fig. 20, Fig. 22 is an end view of the mechanism controlling the movement of the packages into the machine, Figs. 23, 24, 25 and 26 are detail views showing the different positions of the package controlling clutch mechanism, Fig. 27 is a view of the rear end of the machine showing the path taken by the package and label during the wrapping operation, and the mechanism for holding the package down upon the carrier, Figs. 28 and 29 are detail sectional views showing the different positions assumed by the mechanism shown in Fig. 27 during the steps of wrapping the label around the package, Fig. 30 is a detail view showing the device for pushing the packages on to the carrier, Figs. 31 and 32 are detail views of the mechanism to which the package is delivered from the transversely operating feed belt, Fig. 33 is a detail view showing the device for holding back one edge of the wrapper while the other edge is folded around the package, Fig. 34 is a detail view showing the package in its initial position on the carrier, Fig. 35 is a similar view showing the second position assumed by the package on the carrier, Figs. 36 and 37 are similar views showing the third and fourth positions of the package and the carrier, Figs. 38 and 39 illustrate the fifth and sixth positions of the package and carrier, Figs. 40 and 41 illustrate the seventh and eighth positions of the carrier, Fig. 42 is a detail view of the mechanism for folding the end flaps, Fig. 43 is a plan section on the sectional line C—C of Fig. 42, Fig. 44 is a transverse sectional view, Fig. 45 is a detail sectional view of the carrier, Fig. 46 is a side view of the same, Fig. 47 is a sectional view on line A—A of Fig. 45, Fig. 48 is a sectional view on the line B—B of Fig. 45, Fig. 49 is a view of the wrapper showing the gummed edges, Fig. 50 is a perspective view showing the position of the package with the wrapper, Figs. 51 and 55 inclusive show in perspective the package and wrapper and the positions assumed by the wrapper in the folding operation.

*Initial wrapper feeding mechanism.*—In the drawing, 2 represents the frame of the machine, 3 the feed plate or table upon which the wrappers or labels are stacked to be fed into the machine, 4 is the upper feed wheel shaft, 5 the lower shaft, each provided with a series of feed wheels 6 and 7 and to these wheels the labels are delivered by the inclined feed plate. (See Figs. 1, 2, 7 and 8). The lower feed wheels have a series of feed belts 8 thereon which pass around a shaft 9. 10 is a driving shaft having a pulley 11 and an operating wheel 11' for convenience in timing the movement of the parts. (See Figs. 1 and 6).

*The gluing mechanism.*—12 is a shaft having a driving connection through gears 13 and 14 with the driving shaft 10, and provided with glue wheels 15. The peripheries of these wheels have recesses 16 therein which prevent the continuous application of the glue to the blanks. Glue wheels 17 are mounted on short shafts 18, which are driven from the shaft 12. (See Fig. 6). The glue wheels 17 are partially immersed in glue pots 19 adjustably mounted on a spreader 20, and gather up the glue and deposit it upon the peripheries of the wheels 15 by which it is applied to the outer edges of the wrapper. (See Figs. 3, 6, 7 and 8.)

21 represents wheels mounted on a shaft 22 and connected across the machine by bars 23, forming in effect a skeleton roll, between which and the wheels 15 the wrappers are fed. (See Fig. 7).

24 is an upper glue pot supported on a bar 25 near the wheels 21 and containing a glue roll 26 driven by a belt 27 from the shaft 5. (See Figs. 3 and 5). The roll 28 contacts with the roll 26 and with the cross bars 23, to apply the glue lengthwise of said bars so that during the passage of the wrapper between the wheels 15 and 21 the glue will be applied to the forward and rear transverse edges of the wrapper on the upper side thereof, as shown in Fig. 49, the movement of the parts being properly timed so that the application of the glue will be close to the transverse edges of the wrapper. The roll 28 is geared to the roll 26 and a scraper roll 29 contacting with the surface of the roll 28 is driven therefrom. (See Figs. 3 and 5). These glue wheels with the glue pots are capable of adjustment transversely of the machine to adapt them for slight variation in the sizes of wrappers.

*The secondary wrapper feeding mechanism.*—This mechanism consists of chain belts 30 arranged upon opposite sides of the machine and engaging sprocket wheels 31, 32 and 33 and a drive sprocket 33'. (See Figs. 1, 2 and 3). Suitable tension is maintained on these belts by means of adjustable sprockets 34 supported by standards 35. The machine is preferably provided on each side with guides 36 in which the chains 30 are slidable. (See Figs. 1, 3, 5 and 9). Between these chains transverse shafts 37 are mounted at intervals in hubs 38, which are grooved to receive yokes 39, carrying set screws 40 for the purpose of shifting the position of the shafts to compensate for the wear of the chain. These yokes have pins 41 forming pivot pins with the chains and provided on the outside of the chains with bars 42 which lie between the chains and the walls of the guides and prevent the yokes from rocking in the movement of the chain through the guides. A sleeve 43 is mounted in each shaft and capable of a limited rotation thereof against the tension of a spring 44. One side of said spring is connected to a hub 45 carrying an arm 46 which rotates with said sleeve and is secured thereto by a locking screw 47. The grippers, by means of which the wrapper is held and drawn between the glue wheels, consist preferably of two members having hubs 48 and 49. The hub 49 has a pin 50 securing it to the shaft 37 a limited rotary movement of the hub 47 being permitted by means of slots 51 in the sleeve 43. The hub 48 has a jaw 52 and the hub 49 has a coöperating jaw 53 between which the forward edge of the wrapper is received and gripped, and the jaw 52 preferably has a face block 54 mounted therein, and the jaw 53 has a V-shaped recess 55 which receives the forward edge of the wrapper and guides it in between the jaws. A collar 56 is mounted on the sleeve 43 and has an arm 57 fitting within a notch 58 and the hub 48 of one of the jaws so that when the sleeve is rotated the hub 48 will be moved to separate its jaw 52 from the jaw 53 against the tension of a spring 59. The opening of one pair of jaws by the rotation of the sleeve will open the other pair also to allow the entrance of the forward edge of the wrapper between them. (See Figs. 11 to 15). The opening of these jaws to receive the wrapper is effected by the engagement of the arm 46 and a bracket 60 mounted on the stud of the sprocket 31. (See Figs. 7 and 8). The position of this bracket is, of course, determined so that it will engage the arm 46 at the proper time to open the gripper jaws and receive the edge of the wrapper and allow the gripper jaws to close and hold the wrapper and feed it forward when its rear edge is about to pass from between the feed wheels.

The glue wheel 21 has a recess 61 in its periphery, the movement of the glue wheels and the grippers being timed so that the grippers will enter the recess and pass between the glue wheels in the operation of applying the glue to the edges of the wrapper. (See Figs. 7 and 8).

As shown in Fig. 6, I prefer to provide guides 62 on each side of the belts 8 to prevent lateral movement of the wrapper. These guides are preferably supported on a cross bar 63.

*The driving mechanism.*—As heretofore stated, the shaft 12 is geared to the shaft 10 to be driven continuously thereby and is provided with a sprocket wheel 64 having a belt connection 65 with a similar sprocket wheel 66, loosely mounted on the lower feed wheel shaft 5. (See Fig. 5).

A sprocket 67 is secured on the shaft 5 and engages the belt 27 to drive the glue roll 26. A notch 68 is provided in the hub of the sprocket 66 and a dog 69 pivoted at 70 on the hub of the sprocket 67 is adapted to enter said notch and temporarily lock the sprocket wheel 66 on the shaft 5. The dog is normally held in interlocking engagement with the notch 68 by a spring 71. It is evident, therefore, that the continuous operation of the shaft 12 will drive the sprocket wheel 66 and will normally drive the shaft 5 and the glue roll through the belt 27 and through the gears 72 and 73 the upper feed wheel shaft will be operated simultaneously to feed the wrappers to the grippers. (See Fig. 5). The mechanism for tripping the dog 69 to temporarily arrest the movement of the feed wheels will be hereinafter explained in detail.

The upper feed wheel shaft has a sprocket wheel 74 secured thereon and a belt 75 connects this sprocket wheel with a wheel 76 secured on a sleeve 77 carried by a shaft 79 that is mounted in the frame 78. These sprocket wheels are preferably in the ratio of four to 1, so that four revolutions of the feed wheel shaft will effect a single revolution of the sleeve 77. A shaft 22 is geared to the shaft 12 to be driven thereby and is provided with a sprocket wheel 80 having a belt 81 which drives a shaft 82, the function of which will hereinafter appear. The shaft 22 also has a sprocket wheel 83 thereon of the same number of teeth as the sprocket wheel 74 and provided with a belt 84 which drives a sprocket wheel 85 mounted on the shaft 79. (See Figs. 20 and 21). The sprocket wheels 76 and 85 have the same number of teeth and operate at the same speed. The sprocket 85, however, is operated continuously with the shaft 22 and its sprocket, while the sprocket 76 will be operated intermittently with the movement of the wrapper feed wheels.

*The package feeding mechanism.*—The package feeding mechanism which I prefer to employ in this machine is supported by a lateral extension 87 of the machine frame 2 and includes a horizontal, transversely operating belt 88 operating over rolls 89, the inner roll having gears 90 and a belt 91 connecting it with the shaft 82. (See Fig. 4). The belt operates over a plate 92 and guides 93 are mounted above said plate between which the packages are fed endwise into the machine and into the path of the wrappers moving lengthwise of the machine.

A plate 94 is arranged in the machine, transversely thereof, whereon the packages are delivered by the belt 88, each package feeding the preceding one until it reaches a point in the path of the wrapper for the initial step of the folding operation.

*The wrapper feed controlling mechanism.*—95 is a rock shaft mounted in the frame of the machine and having a crank 96 connected to one end of a rod 97 whose opposite end is connected to one arm of a bell crank 98 pivotally supported on a bracket 99. A link 100 connects the other arm of the bell crank 98 with an oscillating arm 101 mounted on a rock shaft 102 above the belt 88. A series of fingers 103 are mounted on the shaft 102 and adapted to rest by gravity upon the tops of the packages and slide thereon and the fingers are of sufficient weight so that when the packages pass out from beneath them the fingers will drop down toward the belt oscillating the bell crank 98 and moving the rod 97 lengthwise to rock the shaft 95. (See Figs. 1, 4 and 6). Upon the shaft 95 an arm 104 is mounted, normally out of the path of the dog 69, but when the shaft 95 is rocked the arm will be swung into the path of the dog 69 and lift it out of engagement with the notch 68 and release the wheel 66, thereby allowing the sprocket wheel 66 to run idle and stopping the feed of the wrappers. (See Figs. 17 and 18).

From the foregoing description it will be observed that the wrapper is fed in at one end of the machine and after passing the gluing wheels meets the package fed at one side of the machine transversely with respect to the direction of movement of the wrapper. The feed of the wrappers will cease until the arms 103 (see Fig. 4) are raised again by the movement of a package beneath them. The elevation of these arms will withdraw the arm 104 from contact with the dog 69, allowing the dog to lock the sprocket wheel 66 on the shaft 5 and start the feed wheels to resume the wrapper feeding operation. By this mechanism the initial feed of the wrappers is positively controlled by the presence of a package or articles to be wrapped moving toward the path of the wrapper in the machine.

*Mechanism for controlling the feed of the package.*—It is important in a machine of this kind, where the wrapper and the package travel unequal distances along intersecting lines, that some means be provided for gaging or timing the delivery of the package into the path of the wrapper so that the gummed wrapper will be in proper position to receive the package and permit the initial step of the folding operation to be performed without stopping the movement of the package or the wrapper or delaying their continuous movement through the machine. With this end in view I have provided the mechanism which I will now describe in detail.

As heretofore stated, the sprocket wheels 76 and 85 move at the same rate of speed. A sleeve 77 (see Fig. 21) is loosely mounted on the shaft 79 and secured to the hub of the sprocket wheel 76 to revolve therewith. The inner end of this sleeve is provided with a series of cam faces 106 which engages rollers 107 carried by a hub 108 that is splined on the shaft 79 and adapted to slide lengthwise thereon. A lever 109 is pivoted at 110 on the frame 78 and has a middle portion adapted to inclose the hub 108 and move the hub back and forth on the shaft when the lever is oscillated. A spring 111 normally tends to draw the lever 109 and the hub toward the sleeve 77 and hold the rollers 107 in yielding contact with the cam surface 106. The connection between the hub 108 and the lever 109 preferably consists of an annular groove 112 provided in the hub and adapted to receive screws 113 mounted in the lever, said screws allowing revolution of the hub independently of the lever when the hub is moved lengthwise on its shaft by the engagement of the cam surface 106 therewith. (See Figs. 19, 20 and 21.) A curved slot 114 is provided in the lever 109 wherein the roller 115 is mounted capable of adjustment back and forth in said slot for the purpose of timing the feed controlling mechanism. Evidently, if the sprocket wheels 76 and 85 are of the same size and operate at the same speed the rollers 107 will remain in the hollows between the cam surfaces 106 when both of the said sprocket wheels are in operation. In case, however, the movement of the sprocket wheel 76 is checked by the stopping of the feed wheel shafts, the rollers 107 continuing their movement, the rollers 107 will roll up on the cam surfaces 106 and push the hub 108 toward the sprocket wheel 85. (See Figs. 20 and 21).

A series of shafts 116, preferably four in number, are mounted in the hub of the sprocket wheel 85 and are held against premature revolution by friction blocks 117 and springs 118 fitting within sockets in the hub of the sprocket wheel and yieldingly holding the blocks 117 against the shafts 116 with sufficient pressure to prevent their accidental or premature movement. The shafts project through the sprocket wheel on each side and on the outer ends of said shafts levers 119 are mounted and when the lever 109 is forced toward the sprocket wheel 85 the roller 115 will be moved into the path of the levers 119 to actuate them and rock their shafts. On the opposite ends of the shafts 116 cams 120 are mounted and operated by the movement of the levers 119 and the rocking of their shafts. (See Figs.

20, 21 and 22). An arm 121 is pivoted on the frame 78 and carries a roller 122 which projects into the path of the cams 120. A rod 123 provided with a turn buckle 124 connects the arm 121 with an arm 125 on a rock shaft 126. A stop 127 is carried by said shaft and is adapted to be moved thereby into the path of the incoming package on the plate 94, the stop being swung through a slot 128 in said plate to positively check the incoming package. (See Figs. 20, 21, 22 and 25). The arm 121 is preferably provided with a notched lower end that is engaged by a spring 129 which permits the oscillation of the arm 121 in either direction, but prevents it and its connections from moving too far through momentum of the parts. (See Fig. 22).

I also prefer to provide pins 130 mounted in the hub of the sprocket 85 in the path of the cams 120, said pins operating to limit the oscillation of said cams and causing the arms 119 to be set in the same position with every operation of the mechanism so that their engagement with the roller 122 will take place at the same point in their revolution. (See Fig. 22.) Whenever the operation of the feed wheels is checked through the mechanism heretofore described, the checking taking place preferably when there are less than five packages in the machine, the lever 109 will be actuated and the roller 115 moved into the path of the arms 119 whereupon said arms and the cams connected therewith will swing to the position indicated by full lines in Fig. 23, the sprocket wheel 85 revolving from left to right. The engagement of the lever 119 with the roller will swing the cam on the other side of the sprocket wheel hub away from its pin 130, as shown in Fig. 23. This engagement of the lever 119 with the roller 115 is for the purpose of setting the cam 120 in position to contact with the roller 122. As the mechanism revolves one-quarter the speed of the feed wheels, some little time will necessarily elapse before the cam 120 engages the roller 122. This period of time is sufficient for the last wrapper fed into the machine to move to the point of intersection with the package and be properly centered to receive the package before the package controlling mechanism or the stop 127 has been actuated to shut off the supply of packages. Each cam 120 has a hook portion 131 which engages the rollers 122 to swing the cams back to their normal position and throw the levers 119 outwardly or until the cams contact with the stops 130. If, in the meantime, the initial or blank feeding mechanism has begun to operate again, one of the levers 119 will be in position to again engage the roller 115 and cause the arm 121 and the roller 122 to be returned to their normal position and the stop 127 withdrawn from the path of the packages. (See Figs. 21 to 26.)

The adjustment of the roller 115 is desirable for at the time when the roller 107 is on the high part of a cam 106 the roller 115 must be at a point where it will contact with the lever 119. If the movement of these parts is properly timed, contact of the rollers 107 with the cam surfaces 106 will move the roller 115 into the path of the levers 119 at the proper time and should the feeder mechanism begin operation the roller 115 will remain out of the path of the levers 119 and the cams 120 will be in the position shown in Fig. 22 and the roller 122 will assume the position shown by full lines in said figure. This movement of the roller 122 will not, however, take place until the wrapper has had ample time to travel from the initial feed mechanism to a point beneath the package delivering mechanism, the construction being such that two packages will be delivered after the feed wheel mechanism has been stopped and when the package feeding mechanism has been checked it will not start again until the feed mechanism has delivered two wrappers.

*The wrapper mechanism.*—When the package has been delivered upon the plate or shelf 94 (see Fig. 3) and centered in the machine, it will be in position to be placed upon the wrapper preliminary to the initial folding operation. The movement of the parts is so timed that when the package is in position to be discharged from the shelf 94 upon the carrier the wrapper will be moved to a point on the carrier where an accurate register of the package and the panel of the wrapper will take place. (See Fig. 3.) The discharge of the package from the shelf 94 I prefer to effect by means of belts 132 engaging sprockets 133 carried by shafts 82 and 135. Arms 136 are mounted on said belts in position to engage the wall of the package and push it off the shelf 94. (See Fig. 3). These belts are arranged side by side a suitable distance apart and the arms are so positioned thereon that they will engage the package just at the time when the wrapper is positioned on the carrier to receive it. Rails 94' are provided with a shelf 94 between which rails a package is discharged from said shelf and I prefer to slidably mount bars 136' in said rails having outwardly turned ends to receive the package. These bars are yieldingly held toward the package by springs 136''. These bars operate to center a package between them, holding the packages with sufficient friction to prevent them from getting out of register with the panel of the wrapper. At the same time the pressure of the bars does not in any way interfere with the descent of the package and the plunger plate into the carrier. Centrally arranged in the machine frame beneath the package receiving shelf is a pair of belts 137 in a track 137'. The belts 137 pass around sprocket wheels 138 and 139 mounted on shafts 140 and 141. These belts are below the grippers, as clearly shown in Fig. 3 and their function is to carry the folder carriages or carriers by means of which the wrapper folding operation is performed. A series of carriers are mounted on the belts 137 at suitable intervals and as these carriers are all of substantially the same construction I will describe the parts and the operation of one carrier only, the same description being applicable to all of the carriers. Each carrier has a floor or base 142 through which rods 143 pass with their ends secured to the belts 137. One of the rods is loosely mounted in the base to allow the carrier to pass easily around the sprocket wheels whereon the belts are mounted. (See Figs. 45 and 47.) Secured to the floor 142 are side walls 144 and between these walls a plate 145 is vertically slidable and mounted on a plunger 146 having bearings in a stud 147 carried by the base 142. A pin 148 is mounted on said stud and carries an anti-friction roller 149. This roller is adapted to engage a cam track 150. The wall of the stud 147 has a vertical slot 151 therein which allows the vertical reciprocation of the plunger 146 to raise or lower the plate 145. (See Figs. 3, 34 and 48.) A cam track 150 is disposed in such a position that the anti-friction roller 149 will contact therewith and lift the plate 145 just at the time the carrier is passing the shelf 94, and the plate 145 will thereby be raised into position to receive the package from said shelf. As the carrier moves along after receiving the package, the roll 149 sliding down on the cam track 150 will alow the plate 145 to settle down between the side walls 144 of the carrier. (See Fig. 35). One side wall has an outwardly inclined upper portion 152 and the opposite side wall has a hinged section 153 which present inclined surfaces to the wrapper, as indicated in Figs. 35 and 47, and prevent it from being torn or damaged as the package descends into the carrier.

I prefer to hold the hinged section 153 in its inclined position by means of a spring 154. (See Figs. 45 and 47).

For the purpose of holding the package down on the carrier and insuring the descent of the supporting plate and plunger, I provide a frame 155 mounted on a rock shaft 156 and having bars 157 which are adapted to rest on the top of the package during the initial steps of the folding operation. The pressure of the bars on the package is released by means of a crank 158 mounted on the shaft 156 and engaging the surface of a cam 159 that is mounted on a shaft 160. (See Fig. 27). A belt 161 is mounted on the shaft 160 and on a sprocket wheel 162 carried by the shaft 82 and arms 163 are mounted on said belt and provided with pivoted fingers 164 held in a position at right angles substantially to the arms 163 by a spring 165. (See Figs. 3 and 33). These fingers are adapted to engage the rear edge of the wrapper and hold it back while the forward portion of the wrapper is being folded around the package, as shown in Figs. 3 and 35. Shortly after the engagement of the wrapper blank with the finger 164 the packages will pass out from under the pressure bars. The forward edge of the wrapper will be held by the grippers, as shown in Fig. 35. A trip 166 is provided in the path of the grippers to engage the arm 46 and open the gripper jaws to release the wrapper. (See Fig. 36).

When the wrapper has been drawn against the front wall of the package and released by the grippers, it is engaged by a roller 167 mounted on arms 168 that are carried by a rock shaft 169. An arm 170 is mounted on said rock shaft and a fork 171 is pivotally connected with said arm and adapted to straddle the shaft 160. (See Figs. 27, 28 and 29). A cam 171' is mounted on the shaft 160 and engages an anti-friction roller 171'' carried by the fork 171. The roller 167 moves over the package close to the wrapper and its function is to smooth the wrapper without pressing it firmly against the package, and when the package reaches a point where the roller is about to drop over the rear corner of the package the roller 171'' will pass off the high point of the cam 171' and the fork 170 will be returned by the spring 175 to its normal position, causing the roller 167 to drop quickly past the corner of the package and crease the edge of the wrapper. During the time the roller is bending the edge of the wrapper around the corner of the package the wrapper will be held firmly by wheels 176 supported in suitable hangers 177. I prefer also to provide rollers 178 carried by an arm 179 that is mounted on a short shaft 179' beneath the shaft 160. An arm 179'' is mounted on the shaft 179' and has an anti-friction roller to engage the periphery of the cam 159, and when the high point of this cam engages this anti-friction roller the shaft 179' will be oscillated to raise the rollers 178 and allow the package to pass beneath them. When this has been done the rollers will drop back upon the package and hold it securely on its supporting plate, and cause the plate and plunger to follow the downward incline of the cam track. (See Figs. 27, 28 and 29).

180 represents a stud mounted in the base 142 and on this stud a yoke 181 is slidable and supports an anti-friction roller 182. This roller is adapted to travel between the rails 183 and 184. In the initial movement of the package or when the wrapper is being folded around it, the rails 183 and 184 are parallel and substantially straight, but at the point where the folding of the wrapper at the ends of the package is begun the rails are provided with cam surfaces 185 engaging the roller 182 to actuate the yoke. (See Figs. 36, 37, 38 and 39). The yoke has arms 186 projecting upwardly on each side of the carrier and upon these arms plates 187 are mounted, having diagonal slots 188 therein. (See Figs. 45 and 46.) Upright shafts 189 and 189' are journaled in bearings on the walls 144 and arms 190 are secured on the lower ends of shafts 189 having anti-friction rollers 191 adapted to enter the slots 188. (See Figs. 46 and 47). Arms 192 have hubs 193 journaled in bearings 194 on the walls 144, said arms being arranged in pairs on opposite sides of the carrier and the hubs 193 having teeth 195 meshing with the other hub of the same pair, so that when one arm of the pair is oscillated the other arm will be correspondingly moved.

Mounted upon the outer ends of the arms 192 are folder wings 196 that are adapted to swing back and forth across the ends of the carrier in position to engage the projecting ends of the wrapper and press them inwardly against the package. Prior to the operation of the folders 196, the package will have descended to a point where the projecting ends of the wrapper at the bottom of the package will contact with wings 197 mounted on pins 198 which project outwardly from a plate 199 that is interposed between the floor 142 and the plate 145. A spring 200 is interposed between the wings 197 and the plate 199 and normally holds the wings 197 at the limit of their outward movement so that the end of the wrapper may be folded upwardly by contact with the top of these wings without danger of tearing. A stationary folder device 201 is mounted on the plate 199 and projects outwardly and upwardly, being inclined to such an extent that the point of the fold will be turned inwardly against the package in much the same manner as it would be by the finger of the operator when the package is wrapped by hand. This manner of mounting the folder wings 197 adapts the device for slight variation in the length of the box without affecting the accuracy of the fold or the perfect register of the panels of the wrapper with the panels of the package. (See Fig. 45). I prefer also to provide set screws 202 on the arms 192 in position to engage the hinged section 153 and swing it to a vertical position against the wall of the package, for the purpose of forcing the gummed edges of the wrapper together as the package is drawn down into the carrier. (See Figs. 45 and 46).

At the rear of the frame 2 is a frame 203 wherein pulleys 204 are mounted to engage belts 205 which also pass around inclined pulleys 206 carried by brackets 207 which are adjustably mounted on a cross bar 208 extending from side to side of the machine. The adjustment of the brackets 207 allows the distance between the pulleys 206 to be increased or decreased, as desired. A series of idle rolls 209 are supported by the frame 203 in contact with the inner stretches of the belts 205 to hold them in parallel relation and in contact with the ends of the packages. The pulleys 206 have disks at their lower end. These disks are flat and circular in form and inclined slightly to the horizontal and positioned so that their edges will contact with the wrapper in the angle between the upper end corners of the wrapper and the end flaps, thereby forming transverse creases to insure a straight fold or bend in the flap. Rods 212 are mounted in the cross bar 208 and have shoes 213 at their lower ends provided with turned up ends 214 and adapted to bear on the top of the package, holding the wrapper firmly against the package while the creasing operation is performed by the disks 211. (See Fig. 42). As the carrier approaches the sprocket 139 the plunger will be raised, leaving the package between the belts 205, which will complete the folding operation, and by these belts the package will be delivered to a way 215 and directed out of the machine. The pulleys 204 are geared to a transverse shaft 217 that is driven by a belt 218 from the shaft 141, and the shaft 141 is geared to a shaft 220 which extends lengthwise of the machine and is geared to the shaft 12. (See Figs. 1 and 5).

In Figs. 49 to 55 I have illustrated the successive steps in the operation of folding the wrapper around the package. The wrapper I will designate by reference numeral A having the gummed edges B applied in the manner described in the specification and assembled with the package C, which is delivered in the path of the wrapper in the manner heretofore set forth. The ends of the wrapper are bent and folded around the ends of the package in successive steps, as indicated in Figs. 51 to 54, until finally the package is wholly inclosed and presents the appearance illustrated in Fig. 55.

In the operation of the machine the wrappers are fed by the feed wheels in the well-known way and advanced between the wheels to the grippers. The grippers carry the wrappers between the glue wheels which apply the glue thereto in the manner shown in the last sheet of the drawings, and from the glue wheels the wrapper passes on to the point where the package entering one side of the machine intersects the path of the wrapper. The feed of the package is so timed that when the wrapper passes on to the carrier platform the package will be discharged from the shelf and centered upon the panel of the wrapper. Endwise movement of the packages will cause the forward package to be advanced by those in the rear, resulting in a continuous feed until such time as the attendant fails to put a package on the feed belts and allows the fingers, ordinarily resting upon the package, to drop down toward the belt. When this is done the clutch controlling the movement of the feed wheels will be operated and will check the movement of the wheel temporarily. At the same time the clutch mechanism controlling the package stop will be rendered operative and the stop will be swung into the path of the incoming package, and the feed of the packages will be thereby arrested until the fingers are again raised to set the clutch and start the feed wheels. Absolute control is thereby maintained over the feed of the wrappers and the feed of the packages. Any interruption in the feed of one results immediately in a corresponding checking of the feed of the other. There will be no danger, therefore, of clogging the machine with the wrappers in case there should be some interruptions in the continuous feed of the packages. As soon as the packages are delivered to the carriers the wrapping operation is commenced and will continue by successive steps until the packages pass out at the end of the machine with the wrapper smoothly and neatly folded thereon and the lapping edges gummed and secured together.

I have shown and described this mechanism in use in connection with cereal food packages, but obviously packages of other kinds may be wrapped with equal facility.

I claim as my invention:

1. The combination, with a wrapping machine with means for feeding the wrappers, of means for feeding the packages to be wrapped into the path of the wrappers, means engaged by a package for starting the feed of the wrappers, and means governed by the wrapper feeding mechanism for moving a stop into the path of the package.

2. The combination, with means for feeding the wrappers and applying glue to the edges thereof, of means for feeding the packages to be wrapped into the path of the glued wrappers, means controlled by the packages for starting and stopping the feed of the wrappers, and means governed by the wrapper feeding mechanism for stopping the movement of the packages and releasing them.

3. The combination, with means for feeding the wrappers and applying glue to the edges thereof, of means for feeding the packages to intersect the path of the wrappers, means controlled by the position of the package for starting and stopping the feed of the wrappers, and a clutch mechanism rendered operative by the stopping of said wrapper feeding mechanism for stopping the movement of the packages.

4. The combination, with a frame and means for feeding wrappers at one end of said frame lengthwise thereof, said means including belts, grippers mounted thereon, a gumming means through which the wrappers are drawn by said grippers, means for feeding the packages transversely of said frame to intersect the path of the moving wrappers, a wrapping carrier over which the gummed blanks are fed, a package support whereto the packages are delivered by said package feeding means, and arms mounted to engage the package and discharge it from said support into said wrapping carrier and upon the interposed wrapper.

5. The combination, with a frame and means for feeding the wrappers at one end of the frame lengthwise thereof, of means for gumming the edges of the wrappers, means for feeding the packages transversely of said frame, endless belts operating lengthwise of said frame, a series of wrapping carriers supported by and between said belts and over which carriers the gummed blanks are fed, means for delivering a package into a carrier and upon the wrapper therein, and means for centering the package on the panel of the wrapper.

6. The combination, with a frame, of means for feeding the wrappers into one end of said frame lengthwise thereof, means for feeding the packages transversely of said frame to intersect the path of the wrappers, means controlled by the position of a package for starting and stopping the feed of the wrappers, a stop device arranged to be moved into the path of the packages to arrest the feed thereof, and means rendered operative by the stopping of the wrapper feeding mechanism for projecting said stop into the path of the packages.

7. In a wrapping machine, the combination, with the initial wrapping and feeding means and means for gumming the wrappers, of means for feeding the packages into the path of the wrappers, a wrapping carrier, a cam guide-way for said carrier, means for feeding the wrappers over said carrier, means for delivering a package into a carrier, and means for centering the package on the wrapper beneath in said carrier.

8. The combination, with means for feeding and gumming the wrappers, of means for feeding the packages into the path of the wrappers, a shelf whereon the packages are delivered by said feeding means, a carrier having a plate whereon the wrapper panels are centered, means for delivering a package from said shelf upon said plate and panel, and yielding guides engaging the ends of the package between said shelf and carrier.

9. In a wrapping machine, the combination, with means for feeding and gumming the wrappers, of means for feeding the packages to be wrapped to intersect the path of the wrappers, endless carrier belts, a series of carriers pivotally supported by and between said belts, each carrier having a plate whereon the wrapper panel is centered, means for feeding the wrappers over said plate, a shelf whereto the package is delivered, a carrier having a plate whereon the wrapper panel is centered, means for discharging the package upon said wrapper panel, and yielding bars mounted to center the package on said panel.

10. In a wrapping machine, the combination, with means for feeding and gumming the wrappers, of means for feeding the packages to be wrapped into the path of the wrappers, a carrier including a plunger and a plate carried thereby whereon the wrapper panel and package are centered, means for drawing down said plunger, said carrier having walls between which said plunger and plate are retracted, one of said walls having a hinged upper section, for the purpose specified.

11. The combination, with means for feeding the wrappers, of means for feeding the packages into the path of the wrappers, a carrier comprising a plate whereon the wrapper and package are centered, a vertically sliding plunger supporting said plate, means including a cam guide for drawing said plate and plunger downwardly into said carrier, means for folding the forward portion of the wrapper backwardly over the top of the package, and means for holding the rear edge of the wrapper away from the rear wall of the package during the folding of the forward portion of the wrapper over the top of the package.

12. In a wrapping machine, the combination, with means for feeding the wrappers, of means for feeding the packages into the path of the wrappers, a carrier comprising a plate, a vertically sliding plunger whereon said plate is supported, said plate being adapted to receive a wrapper and a package thereon, means for folding the forward portion of the wrapper over the top of the package, a belt and a spring pressed finger carried by said belt and operating to hold the rear edge of the wrapper away from the package while the forward edge is folded over the same.

13. The combination, with means for feeding a wrapper and a package, of a carrier, including a vertically sliding support, said support being adapted to receive the wrapper and package thereon, means including a cam guide for withdrawing said support and package down into the carrier to perform the initial folding operation, a roller operating to fold the forward portion of the wrapper over the top of the package, and means for holding the rear edge of the wrapper away from the package during the operation of folding the forward portion thereon.

14. In a wrapping machine, the combination, with a carrier, of means for delivering the wrapper and package thereto, said carrier including a vertically sliding plate whereon the wrapper and package are centered, means for projecting and withdrawing said plate, said carrier having walls operating to bend the side portions of the wrapper upwardly as the package descends therein, means for folding the forward portion of the wrapper over the top of the package and around the rear upper corner thereof, and means for holding back the rear edge of the package during the folding operation of the forward portion of the wrapper.

15. In a wrapping machine, the combination, with a carrier, of means for feeding the wrappers and packages thereto, said carrier including a vertically sliding plate whereon the wrapper and package are centered, said carrier having means to bend the forward and rear portions of the wrapper upwardly beside the walls of the package, a roller operating to bend the forward portion of the wrapper over the top of the package and around the rear upper corner thereof, and a spring pressed finger operating to hold the rear edge of the wrapper out of contact with the corresponding wall of the package during the folding operation of the forward portion of the wrapper.

16. In a wrapping machine, the combination, with a wrapping carrier, of means for feeding the wrappers and packages thereto, said carrier including a plate and a plunger whereon said plate is mounted, means for drawing said plate into said carrier to fold the forward and rear portions of the wrapper, means for bending the wrapper over the top of the package and folding it around the rear upper edge thereof, a belt overhanging said carrier and means carried by said belt and operating to engage the rear edge of the wrapper and temporarily hold it out of contact with the corresponding wall of the package.

17. In a wrapping machine, the combination, with a wrapping carrier, of means for delivering the wrappers and packages thereto, said carrier including a plate and a plunger whereon said plate is mounted, means for drawing said plate into said carrier to fold the forward and rear portions of the wrapper, and means for bending the wrapper over the top of the package and folding it around the rear upper edge thereof.

18. In a wrapping machine, the combination, with a wrapping carrier, of means for delivering the wrappers and packages thereto, said carrier including a plate and a plunger whereon said plate is mounted, means for drawing said plate into said carrier to fold the forward and rear portions of the wrapper, means for bending the wrapper over the top of the package and folding it around the rear upper edge thereof, and a roller operating to smooth the wrapper over the top of the package and around the upper corners thereof.

19. In a wrapping machine, the combination, with means for feeding the wrappers and means for feeding the packages, of a wrapping carrier including means for folding the wrapper against the side walls of the package and over the top of the package, means for folding the lower portions of the projecting ends of the wrapper against the end walls of the package to form the bottom flaps, and means mounted to oscillate in a horizontal plane for folding the side portions of the projecting ends of the wrapper against the end walls of the package to form the side flaps.

20. In a wrapping machine, a wrapping carrier comprising a vertically reciprocating plunger and a cam guide for operating the same, a plate mounted on said plunger and adapted to receive a wrapper and a package, said carrier having walls between which said plate is vertically slidable, said walls operating to bend the forward and rear portions of the wrapper upwardly against the sides of the package, a roller mounted to smooth the wrapper over the top of the package and drop down past the corner thereof to crease the wrapper at that point.

21. In a wrapping machine, a wrapping carrier comprising a base, a reciprocating plunger therein, a plate carried by said plunger and adapted to receive the wrapper and package, means for bending the wrapper up against the side walls of the package, wings provided at each end of the carrier and engaging the wrapper at the ends of the package, and fingers centrally disposed with respect to the carrier and engaging the middle portion of the projecting ends of the wrapper.

22. In a wrapping machine, a wrapping carrier comprising a base, a sliding plate adapted to receive the wrapper and package thereon, means for folding the wrapper up against the side walls of the package, wings provided at the ends of the carrier, pins whereon said wings are slidable, and springs normally holding said wings at the outer ends of said pins, said wings operating to engage and fold the projecting ends of the wrapper upwardly on each side of the middle portion thereof and means engaging said middle portion to form the bends or folds therein, said means projecting outwardly beyond the plane of said wings.

23. In a wrapping machine, an endless belt, wrapping carriers mounted thereon at intervals, each carrier including a reciprocating support whereon the wrapper and package are seated, a cam guide for drawing said support into the carrier, said carrier having walls operating to engage and fold the wrapper against the side walls of the package, and means engaging the projecting ends of the wrapper to fold them against the end walls of the package, said means including wings mounted in pairs at each end of the carrier.

24. In a wrapping machine, a wrapping carrier comprising a sliding plate adapted to receive a wrapper and package, said carrier having walls between which said plate is slidable, said walls engaging the wrapper and folding it upwardly against the walls of the package, wings arranged in pairs at each end of the carrier in position to engage and fold the projecting end portions of the wrapper upwardly, and a finger device interposed between the wings of each pair in position to contact with the middle portion of the wrapper ends.

25. In a wrapping machine, the combination, with an endless carrier belt, of wrapping carriers mounted thereon at intervals, said carriers including a reciprocating wrapper and package support, means for folding the wrapper against the side walls of the package and over the top thereof, means for bending the lower portion of the projecting ends up against the end walls of the package, means for folding the side portions of the projecting ends against the side walls of the package, and a cam track for controlling the operation of said folding and bending means.

26. In a wrapping machine, a series of wrapping carriers and supporting belts therefor, said carriers being arranged at intervals on said belts and each comprising a base and side walls mounted thereon, a plate mounted to reciprocate vertically between said side walls and adapted to support a wrapper and a package thereon, means for drawing said plate downwardly to fold the wrapper against the side walls of the package, and means for folding the ends of the wrapper against the walls of the package.

27. In a wrapping machine, a wrapping carrier comprising a reciprocating plate whereon the wrapper and package are placed, a base having means thereon for folding the wrapper against the side walls of the package, rock shafts mounted vertically on said carrier and having outwardly projecting arms, wings carried by said arms, means for oscillating said shafts and arms to swing said wings against the sides of the projecting ends of the wrapper to fold them inwardly against the ends of the package, and means mounted on said base for folding the lower portions of the projecting ends of the wrapper.

28. In a wrapping machine, a wrapping carrier comprising a reciprocating package and wrapper support, said carrier having side walls arranged to engage and fold the wrapper against the side walls of the package, means at the ends of the carrier to engage the projecting ends of the wrapper at the bottom to form the bottom and end flaps thereon, said means including upright stationary plates spaced apart, and a curved finger interposed between said plates and spaced therefrom.

29. In a wrapping machine, the combination, with means for feeding the gummed wrapper and means for feeding the package into the path of the gummed wrapper, of a series of wrapping carriers, each having a reciprocating support whereon the wrapper and package are delivered, each carrier having side walls operating to engage and fold the wrapper against the side walls of the package, one of said side walls having a hinged upper section, means for forming the lower end flaps and folding them against the ends of the package, means for forming the side end flaps and means actuated by the movement of said side flap forming means for pressing said hinged section against the gummed edges of the wrapper to seal the package.

30. In a wrapping machine, a wrapping carrier comprising a floor and side walls thereon, a package and wrapper support slidable between said walls, means for operating said support to draw the package into said carrier, means for holding the package on support, oscillating wings mounted on said carrier and arranged to engage the projecting ends of the wrapper and form the side flaps thereon, a reciprocating yoke, and means operatively connecting said yoke with said wings to oscillate them intermittently.

31. In a wrapping machine, the combination, with means for feeding the wrappers and means for feeding the packages, of a wrapping carrier, including means for folding the wrapper against the side walls of the package, means for folding the projecting ends of the wrapper to form the side and bottom flaps at the ends of the package, and means for creasing the upper portion of the projecting ends of the wrapper as a preliminary step in the formation of the upper flaps at the ends of the package.

32. In a wrapping machine, a wrapping carrier comprising means for folding the wrapper around the side walls and top of the package, said folding means including a pair of oscillating wings provided on each side of the carrier, and means for creasing the upper portion of the projecting ends of the wrapper to form the end flaps at the top of the package.

33. In a wrapping machine, a wrapping carrier comprising means for folding the wrappers around the side walls and over the top of the package, and creasing wheels arranged to engage the upper portion of the projecting ends of the wrapper and constituting the initial step in the formation of the end flaps at the top of the package.

34. In a wrapping machine, a wrapping carrier comprising means for folding the wrapper against the side walls and over the top of the package, means for folding the side and bottom portions of the projecting ends of the wrapper against the ends of the package, means for creasing the upper projecting end portions of the wrapper, and pressure shoes arranged to bear on the package near the end walls thereof and coöperate with said creasing means.

35. In a wrapping machine, a wrapping carrier comprising a floor and side walls thereon, a package and wrapper support slidable between said walls, means for retracting said support between said walls, a reciprocating yoke having upwardly extending arms, plates mounted on said arms and having diagonal slots therein, arms pivoted on said walls and having anti-friction rolls projecting into said slots, wings carried by said arms and adapted to engage the side portions and the projecting ends of the wrapper, and means for operating said yoke to oscillate said arms and wings.

36. In a wrapping machine, a wrapping carrier having side walls and means for drawing the package and wrapper between them, said walls operating to fold the wrapper against the side walls of the package, arms mounted in pairs on said walls and having toothed hubs, the teeth of one hub of a pair meshing with the teeth of the other hub of the same pair, wings carried by said arms and arranged to contact with the side portions of the projecting ends of the wrapper to fold them inwardly against the ends of the package, and means for oscillating said arms and wings intermittently.

37. In a wrapping machine, a wrapping carrier having side walls and means for drawing the package and wrapper between them, said walls operating to fold the wrapper against the side walls of the package, arms mounted in pairs on said walls and having toothed hubs, the teeth of one hub of a pair meshing with the teeth of the other hub of the same pair, wings carried by said arms and arranged to contact with the side portions of the projecting ends of the wrapper to fold them inwardly against the ends of the package, and a reciprocating yoke operatively connected with said arms to oscillate them and said wings intermittently.

38. The combination, with a frame, of means for feeding the wrappers into one end of said frame lengthwise thereof and in a horizontal plane, means for gumming the edges of the wrappers, a carrier operating transversely of the machine and arranged to feed the packages into the path of said wrappers and operating in the plane of said feeding means to deliver a package upon a wrapper after the gumming operation, and means rendered operative by the checking of the wrapper feeding mechanism for stopping the feed of the packages.

In witness whereof, I have hereunto set my hand this 16th day of June 1911.

EDWIN GUSTAVE STAUDE.

Witnesses:
GENEVIEVE E. SORENSEN,
EDWARD A. PAUL.